(12) United States Patent
Tsai et al.

(10) Patent No.: US 9,646,096 B2
(45) Date of Patent: May 9, 2017

(54) SYSTEM AND METHODS FOR ANALYZING AND IMPROVING ONLINE ENGAGEMENT

(71) Applicant: Go Daddy Operating Company, LLC, Scottsdale, AZ (US)

(72) Inventors: Justin Tsai, San Francisco, CA (US); Josh Berk, Scottsdale, AZ (US); Rajatish Mukherjee, Sunnyvale, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 410 days.

(21) Appl. No.: 14/295,034

(22) Filed: Jun. 3, 2014

(65) Prior Publication Data

US 2015/0347593 A1 Dec. 3, 2015

(51) Int. Cl.
*G06F 17/30* (2006.01)
*G06F 7/00* (2006.01)
*G06Q 50/00* (2012.01)

(52) U.S. Cl.
CPC ....... *G06F 17/30867* (2013.01); *G06Q 50/01* (2013.01)

(58) Field of Classification Search
CPC .................................................... G06Q 50/01
See application file for complete search history.

(56) References Cited

U.S. PATENT DOCUMENTS

| | | | |
|---|---|---|---|
| 6,263,352 B1 | 7/2001 | Cohen | |
| 6,313,835 B1 | 11/2001 | Gever et al. | |
| 6,601,057 B1 | 7/2003 | Underwood et al. | |
| 6,697,825 B1 | 2/2004 | Underwood et al. | |
| 7,111,229 B2 | 9/2006 | Nicholas et al. | |
| 7,152,207 B1 | 12/2006 | Underwood et al. | |
| 7,668,913 B1 | 2/2010 | Underwood et al. | |
| 7,680,901 B2 | 3/2010 | Rechterman et al. | |
| 7,770,122 B1 | 8/2010 | Shaik | |
| 7,886,221 B1 | 2/2011 | Underwood et al. | |
| 8,136,027 B2 | 3/2012 | Underwood et al. | |
| 8,332,512 B1 * | 12/2012 | Wu | G06Q 30/0254 705/319 |
| 8,447,852 B1 * | 5/2013 | Penumaka | G06Q 30/02 709/217 |
| 8,595,300 B2 | 11/2013 | Underwood et al. | |
| 8,677,234 B2 | 3/2014 | Underwood et al. | |
| 2002/0004755 A1 | 1/2002 | Balthaser | |
| 2004/0249978 A1 | 12/2004 | Marappan et al. | |

(Continued)

*Primary Examiner* — Marc Somers

(74) *Attorney, Agent, or Firm* — Quarles & Brady LLP

(57) ABSTRACT

Systems and methods provide online tools for helping a business improve its online presence. A contact importance score rates a contact's engagement with business via purchases and online contact, and may further gauge the contact's engagement with other contacts and potential contacts. An engagement score rates a business' engagement with online visitors with respect to industry best practices. A method of generating the engagement score may include providing recommendations to the business for improving the engagement score. A method for recommending online content can identify public and privately-created content that is likely to engage a business' users. A website builder can include a tool for aligning content on the website. The website builder can further include a tool for creating a video for promoting the business.

3 Claims, 16 Drawing Sheets

(56) References Cited

U.S. PATENT DOCUMENTS

| | | | |
|---|---|---|---|
| 2005/0076003 A1* | 4/2005 | DuBose | G06Q 30/02 707/1 |
| 2006/0015380 A1* | 1/2006 | Flinn | G06Q 10/0637 705/7.33 |
| 2006/0174199 A1 | 8/2006 | Soltis et al. | |
| 2006/0200751 A1 | 9/2006 | Underwood et al. | |
| 2007/0291049 A1 | 12/2007 | Edwards et al. | |
| 2008/0104026 A1* | 5/2008 | Koran | G06F 17/30867 707/3 |
| 2009/0216577 A1 | 8/2009 | Killebrew | |
| 2010/0050083 A1 | 2/2010 | Axen et al. | |
| 2011/0179357 A1 | 7/2011 | Lin et al. | |
| 2012/0177345 A1 | 7/2012 | Trainer et al. | |
| 2012/0218309 A1 | 8/2012 | Zhang et al. | |
| 2012/0290433 A1* | 11/2012 | England | G06Q 30/0282 705/26.7 |
| 2012/0290959 A1 | 11/2012 | Quine | |
| 2013/0110641 A1* | 5/2013 | Ormont | G06Q 50/01 705/14.66 |
| 2013/0173333 A1* | 7/2013 | Zhang | G06Q 50/01 705/7.29 |
| 2013/0332475 A1* | 12/2013 | Michelstein | G06F 17/211 707/756 |
| 2015/0332666 A1 | 11/2015 | Dayan et al. | |

\* cited by examiner

SYSTEM AND METHODS FOR ANALYZING AND IMPROVING ONLINE ENGAGEMENT

FIELD OF THE INVENTION

The present invention generally relates to online communication with an audience, and, more specifically, to systems and methods for efficiently and effectively generating a web presence that conveys desired information to various requesters and facilitates user interaction with the requesters.

BACKGROUND OF THE INVENTION

The Internet comprises a vast number of computers and computer networks that are interconnected through communication links. The interconnected computers exchange information using various services. In particular, a server computer system, referred to herein as a web server, may connect through the Internet to a remote client computer system and may send, to the remote client computer system upon request, one or more websites containing one or more graphical and textual web pages of information. A request is made to the web server by visiting the website's address, known as a Uniform Resource Locator ("URL"). Upon receipt, the requesting device can display the web pages. The request and display of the websites are typically conducted using a browser. A browser is a special-purpose application program that effects the requesting of web pages and the displaying of web pages.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name. A domain can further host multiple websites that can be accessed by appending character strings that constitute the full path to the website's files. For example, the domain for FACEBOOK includes one or more websites, as the term is used herein, for each of its users. A user-specific website is requested by appending a directory to the FACEBOOK main URL, e.g.: http://www.facebook.com/username.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

The information on web pages is in the form of programmed source code that the browser interprets to determine what to display on the requesting device. The source code may include document formats, objects, parameters, positioning instructions, and other code that is defined in one or more web programming or markup languages. One web programming language is HyperText Markup Language ("HTML"), and all web pages use it to some extent. HTML uses text indicators called tags to provide interpretation instructions to the browser. The tags specify the composition of design elements such as text, images, shapes, hyperlinks to other web pages, programming objects such as JAVA applets, form fields, tables, and other elements. The web page can be formatted for proper display on computer systems with widely varying display parameters, due to differences in screen size, resolution, processing power, and maximum download speeds.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. However, presently-existing systems and methods for designing and launching a website require a user wishing to establish an online presence to navigate through a complicated series of steps to do so. First, the owner must register a domain name. The owner must then design a website, or hire a website design company to design the website. Then, the owner must purchase, configure, and implement website-related services, including storage space and record configuration on a web server, software applications to add functionality to his website, maintenance and customer service plans, and the like. This process can be complicated, time-consuming, and fraught with opportunity for user error. It may also be very expensive to produce, serve, and maintain the user's website. Merchants may be hesitant to create an online presence because of the perceived effort involved to do so. These merchants limit their business to offline "brick and mortar" points of sale.

Some existing website design approaches can simplify the design process through automation of certain of the design process steps. Typically, a user is provided a template comprising a fully or substantially hard-coded framework. The user must then customize the framework by providing content, such as images, descriptive text, web page titles and internal organizational links between web pages, and element layout choices. However, users that are not experienced with website design or have little time to focus on the details may publish websites that contain layout errors, such as misaligned content, and may not have the capacity to produce valuable website content such as business-promoting videos.

Furthermore, a valuable web presence now extends far beyond the user's website. Customers commonly engage with businesses and with each other online via social networks, business listing services, and email and other direct communication. There can be significant pressure on a business to stay in close contact with its customers by quickly responding to their messages and routinely posting online content that engages customers and draws new visitors to the user's social network pages, business listings, and website.

DETAILED DESCRIPTION OF THE PREFERRED EMBODIMENT

Figure 1:
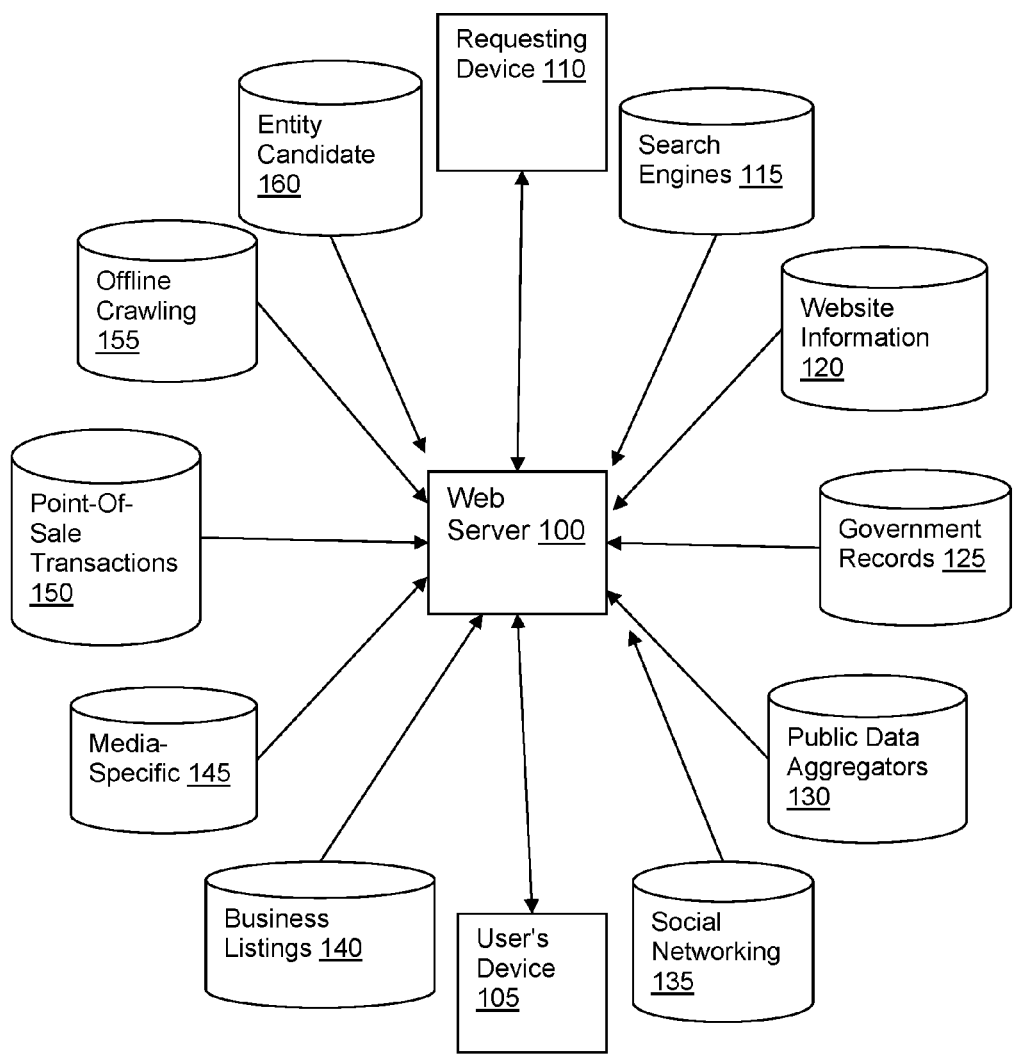
FIG. 1 is schematic diagram of a system and associated operating environment in accordance with the present disclosure.

The present invention overcomes the aforementioned drawbacks by providing a system and method for improving the creation and management of a website owner's web presence by automatically retrieving information from a number of data stores to promote the website owner's social media engagement and presented content. The system and method further improves the presentation of content within the website owner's website by automatically producing content and rearranging content according to favorable placement and alignment rules. The web server tasked with serving the web page to requesting devices, also known as a hosting provider, may perform one or more disclosed algorithms. Alternatively, the web server may assign the performance to a related computer system, such as another web server, collection of web or other servers, a dedicated data processing computer, or another computer capable of performing the algorithms. Alternatively, a standalone program may be delivered to and installed on a personal computing device, such as the user's desktop computer or mobile device, and the standalone program may be configured to cause the personal computing device to perform the algorithms. For clarity of explanation, and not to limit the implementation of the present methods, the methods are described below as being performed by a web server that serves the web page to requesting devices. The creation of web pages is described with a left-sided prioritization for left-to-right reading countries; it will be understood that left and right directions may be reversed for right-to-left reading countries.

In one implementation, the present disclosure describes a method by a server computer electronically connected to a communication network. The method includes collecting interaction data of a user, and calculating one or both of a contact importance score for each of one or more contacts that produced a portion of the interaction data, and an engagement score for the user. The contact importance score may include a plurality of components, including one or more of a contact type, a contact location, a contact industry, a contact purchase history, a contact interactivity history, and a contact online reach. Calculating the importance score may include obtaining a value for each of the plurality of components, adjusting the values of each of the components according to a predetermined weight corresponding to the importance of the component to an industry of the user, and combining the values to obtain the contact importance score. The method may further include, for each contact for which the contact importance score is calculated, identifying the contact from the interaction data and collecting contact data from one or more data stores, the contact data being related to the contact's interactions with the user. The contact importance score may be calculated for the contact from the contact data. The method may further include organizing each discrete element of the interaction data as a feed entry in a single feed and displaying, via an interface, the single feed to the user with the feed entries arranged by contact importance score of the contact that produced the discrete element of the interaction data. The method may further include receiving a selection of one or more of the feed entries, and updating the calculating step according to the selection.

The method may include collecting engagement data that includes the interaction data and web presence data, and calculating one or more components of the engagement score from the engagement data; the engagement score may be calculated using the components of the engagement score. The method may further include presenting to the user one or more recommendations for improving the engagement score. The recommendations may correspond to an age of the user's business. The method may further include determining the age of the user's business within a business lifecycle framework. The components of the engagement score may correspond to one or more best practices of an industry of the user's business. The computer server may calculate both of the contact importance score and the engagement score, and the method may further include identifying the contact from the interaction data and collecting contact data from one or more data stores, the contact data being related to the contact's interactions with the user. The contact importance score may be calculated for the contact from the contact data. The contact importance score may include a plurality of components, including one or more of a contact type, a contact location, a contact industry, a contact purchase history, a contact interactivity history, and a contact online reach.

The method may further include identifying, according to an algorithm, a plurality of potential content, receiving a selection of the potential content as selected content, posting the selected content to one or more online platforms of the user, and updating the algorithm based on the interaction data, the interaction data including one or more interactions of the user's audience with the selected content. Identifying the plurality of potential content may include searching one or more data stores for public content using one or more keywords related to an industry of the user. The interaction data may be used to identify the potential content.

In another implementation, the present disclosure describes a method by a server computer electronically connected to a communication network. The method includes identifying a plurality of potential content including one or both of public content and original content, and posting one or more of the plurality of potential content to one or more platforms of a user, wherein identifying the original content includes automatically commissioning the generation of the original content. The method may further include monitoring one or more interactions of the user's audience with the posted potential content and updating a ratio of original content to public content based on the monitored interactions, the ratio being used to identify the potential content. The method may further include displaying the potential content to the user and receiving a selection by the user of the potential content, wherein the potential content that is posted to the one or more platforms is the potential content selected by the user. The method may further include determining a strategic time for posting content to the one or more platforms, receiving from a user an identification of "smart post" potential content, and posting the "smart post" potential content to the one or more platforms at the strategic time. The strategic time may depend on the user's industry.

In yet another implementation, the present disclosure describes a method by a server computer electronically connected to a communication network. The method includes providing an interface for configuring the server computer to generate a website, receiving a request to align a plurality of elements on one or more web pages of the website, aligning the elements, and publishing the one or more web pages. The interface may include a grid having a selected resolution, and the method may include aligning a top edge and a left edge of a first of the elements with the grid, and aligning a top edge of each of the remaining elements with the top edge of the first element. Aligning the elements may include: from the elements, creating a plurality of groups of elements; aligning each of the groups with the other groups; and, within each group, aligning the elements of the group with each other. Aligning the elements may further include aligning at least one element from each group with at least one element of one or more of the other groups. Creating the plurality of groups may include identifying one or more contextual indicators that two or more of the elements should be grouped together, the contextual indicators including one or more of: similarity of element properties, absolute or relative positioning in approximately the same column or row of pixels, placement within common HTML tags, and similarity of element types. The contextual indicators may further include a graphical similarity to a standard web page structure. Aligning the elements may further include creating one or more family groups containing a plurality of the groups, and aligning the groups within each family group.

The elements may include a plurality of images. A first of the images may have a greater height than a second of the images, and aligning the elements may include resizing the height of the second image to the height of the first image. Aligning the elements may include determining if a first of the elements and a second of the elements are misaligned vertically by less than an alignment threshold and, if so, moving the second element into a desired vertical alignment with the first element. Aligning the elements may include determining if the elements should be uniformly spaced horizontally and, if so, moving one or more of the elements so that the elements are uniformly spaced horizontally. Aligning the elements may include comparing a graphical layout of the elements to one or more standard web page structures.

The interface may be a website builder application. The website builder application may be configured with a drag-and-drop web page layout designer. The website builder application may be further configured to display a button that the user presses to request alignment of the elements on the web page.

In yet another implementation, the present disclosure describes a method by a server computer electronically connected to a communication network. The method includes collecting video content from a website, the video content including theme data and presentation data, producing a video from the video content, and publishing the video. The theme data may include a color scheme, and the color scheme may be identified from one or more images on the website. The color scheme may be identified using frequency analysis of pixel colors in the one or more images. The presentation data may include a business name, one or more images, and one or more paragraphs of text. The method may further include collecting supplemental video content, wherein the video is produced from the video content and the supplemental video content. The supplemental video content may be collected from one or more data stores not including the website. Producing the video may include transmitting to a video production service the video content and receiving the video from the video production service. Publishing the video may include adding the video to a web page of the website.

In yet another implementation, the present disclosure describes a method by a server computer electronically connected to a communication network. The method includes collecting video content from a website, the video content including theme data including a color scheme of the website, and presentation data including a business name, a plurality of images, and a plurality of paragraphs of text. The method further includes producing a video from the video content, the video promoting a business described by the website, and publishing the video to the website. The theme data may further include one or more of a business logo, a font, a typeset, one or more design elements, and one or more sound files. The method may further include collecting supplemental video content, wherein the video is produced from the video content and the supplemental video content. The supplemental video content may be collected from one or more data stores not including the website. The data stores may include one or more of: a search engine; a website information database; a government records database; a public data aggregator; a social networking data store; a business listing data store; and a media-specific data store. Producing the video may include transmitting to a video production service the video content and receiving the video from the video production service.

Referring to FIG. 1, a web server 100 may be configured to communicate over the Internet with one or more requesting device 110 in order to serve requested website content to the requesting device 110. The requesting devices 110 may request the website content using any electronic communication medium, communication protocol, and computer software suitable for transmission of data over the Internet. Examples include, respectively and without limitation: a wired connection, WiFi or other wireless network, cellular network, or satellite network; Transmission Control Protocol and Internet Protocol ("TCP/IP"), Global System for mobile Communications ("GSM") protocols, code division multiple access ("CDMA") protocols, and Long Term Evolution ("LTE") mobile phone protocols; and web browsers such as MICROSOFT INTERNET EXPLORER, MOZILLA FIREFOX, and APPLE SAFARI.

A requesting device 110 may be a device for which web pages are typically designed without concern for display, user interface, processing, or Internet bandwidth limitations, including without limitation personal and workplace computing systems such as desktops, laptops, and thin clients, each with a monitor or built-in large display (collectively "PCs"). A requesting device 110 may be a device that cannot display the informational and functional content of web pages that are designed for viewing on PCs. Such limited devices include mobile devices such as mobile phones and tablet computers, and may further include other similarly limited devices for which conventional websites are not ordinarily designed. Mobile devices, and mobile phones in particular, have a significantly smaller display size than PCs, and may further have significantly less processing power and, if receiving data over a cellular network, significantly less Internet bandwidth.

The web server 100 may be configured to create and/or serve a website that adapts to the requirements of requesting devices 110 with different capabilities as described above. In some embodiments, such adaptation may include generating a plurality of versions of the website that convey substantially the same content but are particularly formatted to be displayed on certain requesting devices 110, in certain browsers, or on certain domains (e.g. FACEBOOK or GOOGLE+). For example, the web server 100 may generate a first version of the website that is formatted for PCs, and a second version of the website that is formatted for display on mobile phones. In other embodiments, such adaptation may include converting a website from a format that can be displayed on one type of requesting device 110 into a website that can be displayed on another type of requesting device 110. For example, the web server 100 may, upon receiving a request for the website from a mobile phone, convert the website designed to be displayed on a PC into a format that can be displayed on the mobile phone. In the present disclosure, therefore, the term website refers to any public, private, or semi-private web property on which a user may maintain information and allow the information to be presented to the public or to a limited audience, and which is communicable via the Internet. Non-limiting examples of such web properties include websites, mobile websites, web pages within a larger website (e.g. profile pages on a social networking website), vertical information portals, distributed applications, and other organized data sources accessible by any device that may request data from a storage device (e.g., a client device in a client-server architecture), via a wired or wireless network connection, including, but not limited to, a desktop computer, mobile computer, telephone, or other wireless mobile device; content feeds and streams including RSS feeds, blogs and vlogs, YOUTUBE channels and other video streaming services, and the like; and downloadable digital platforms, such as electronic newsletters, blast emails, PDFs and other documents, programs, and the like.

Furthermore, the web server 100 may be configured to serve a user interface to the device 105 that is able to connect electronically to the web server 100 over the Internet or another computer network, and is used to maintain the website and other elements of the owner's web presence. The user device 105 may be any suitable web access device, including a personal computer, tablet, smartphone or other mobile device, and the like. The web server 100 may be configured to adapt and serve the user interface to any user device 105 used to access the web server 100. The user may be an individual, a group of individuals, a business or other organization, or any other entity that desires to build a website or web presence and use it to convey information about itself or another topic, where the information may be of a commercial or a non-commercial nature. For clarity of explanation, and not to limit the implementation of the present methods, the methods are described below as being performed by a web server that receives input for creating a website for a small business, such as a restaurant or bar, retail store, or service provider (i.e. barber shop, real estate or insurance agent, repair shop, equipment renter, and the like), unless otherwise indicated.

The web server 100 may be configured to communicate electronically with one or more data stores in order to retrieve information from the data stores. The electronic communication may be over the Internet using any suitable electronic communication medium, communication protocol, and computer software including, without limitation: a wired connection, WiFi or other wireless network, cellular network, or satellite network; TCP/IP or another open or encrypted protocol; browser software, application programming interfaces, middleware, or dedicated software programs. The electronic communication may be over another type of network, such as an intranet or virtual private network, or may be via direct wired communication interfaces or any other suitable interface for transmitting data electronically from a data store to the web server 100. In some embodiments, a data store may be a component of the web server 100, such as by being contained in a memory module or on a disk drive of the web server 100.

A data store may be any repository of information that is or can be made freely or securely accessible by the web server 100. Suitable data stores include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future; file systems; and electronic files such as web pages, spreadsheets, and documents. Each data store accessible by the web server 100 may contain information that is relevant to the creation of the website, as described below. Such data stores include, without limitation to the illustrated examples: search engines 115; website information databases 120, such as domain registries, hosting service provider databases, website customer databases, and internet aggregation databases such as archive.org; government records databases 125, such as business entity registries maintained by a Secretary of State or corporation commission; public data aggregators 130, such as FACTUAL, ZABASEARCH, genealogical databases, and the like; social networking data stores 135, such as public, semi-private, or private information from FACEBOOK, TWITTER, FOURSQUARE, LINKEDIN, and the like; business listing data stores 140, such as YELP!, Yellow Pages, GOOGLE PLACES, LOCU, and the like; media-specific data stores 145, such as art museum databases, library databases, and the like; point-of-sale transaction data stores 150; offline crawling data stores 155; and entity candidate data stores 160 as described below.

Contact Importance Scoring

The web server 100 may be configured to analyze a plurality of aspects of the user's social media engagement and to provide, through the interface on the user's device 105, displays conveying the results of the analysis to the user. In one aspect, the web server 100 may provide a contact importance score for one or more of the user's contacts. The contact importance score may depend on several factors, including without limitation: the contact type, such as an individual, member/subscriber or non-member, business, critic/press, and the like; the contact's geographic location; the contact's industry of employment; the contact's purchase history; the contact's history of online interactivity with the user; and the contact's own social/online media reach, including metrics such as number of followers or subscribers, posting (i.e., presentation of new media content) frequency on various websites, and the like. The factors may further include one or more scores for the contact that are generated by a separate scoring algorithm. For example, the contact importance score may include as a factor a social media influence score generated for the contact by third party. Non-limiting examples of such third-party scores include: a Klout® score, which is a measurement of the contact's social media network, production of interactive content, and ability to drive action; a PeerIndex score, which measures similar factors to Klout but with time-based averaging of scores; and a Kred score, produced by PeopleBrosr.

The web server 100 may also determine whether the contact uses any particular services, and may adjust the contact importance score accordingly. For example, the web server 100 may produce contact importance scores for the user via the Website Builder application, offered by GoDaddy Operating Company, LLC ("GoDaddy"), and in this environment the web server 100 may determine whether the user uses any other of GoDaddy's small business services, such as its online store or invoicing and bookkeeping services. The web server 100 may value a contact that does use any such services higher than a contact that does not, and may therefore increase the contact importance score for the former contact as compared to the latter contact.

Through analysis and relative weighing of the contact importance score factors, the web server 100 may indicate to the user, via the contact importance score, a particular contact's value to the user's business. The value may be considered contextually in terms of both realized and potential direct and indirect commercial benefit generated by the contact. Direct commercial benefit may be understood as the revenue the business has generated from the contact's purchases as a current or past customer of the user's business. A realized direct commercial benefit may be the total amount of money spent by the contact on the user's goods or services, as identified by the web server's 100 access of the data stores. A potential direct commercial benefit may be an estimation of the contact's continued direct purchases from the user, based on trend analysis of past spending behaviors on the user's and other products, on the contact's social network activity (e.g., a blog post describing the user's product), or on a combination thereof or on other factors. A realized indirect benefit may be an amount of sold products to other customers that were driven to the user's website or store by the contact's advice. Such traffic may be traceable to the contact by several means, including collection of referral information directly from the other customers, and link-tracking in online content. Similarly, a potential indirect benefit may be an analysis of the contact's reach. For example, a contact has a high potential indirect benefit if her social network is large and/or she generates an attractive volume of frequently visited online content.

The user may view the contact importance score as a gauge of the impact the contact has or may have on the user's business. Furthermore, the web server 100 may calculate a contact importance score for a person who is not a customer, but is a potential customer or even simply an entity that is attempting to interact with the user online. For example, the web server 100 may deliver to the user a message from the entity via an online communication channel (e.g., TWITTER, FACEBOOK, email, etc.), and the web server 100 may calculate the contact importance score for that entity by, for example, applying the method below. The user may then reference the contact importance score in deciding whether and how to respond to the entity, whether or not the entity is a customer.

Figure 2:
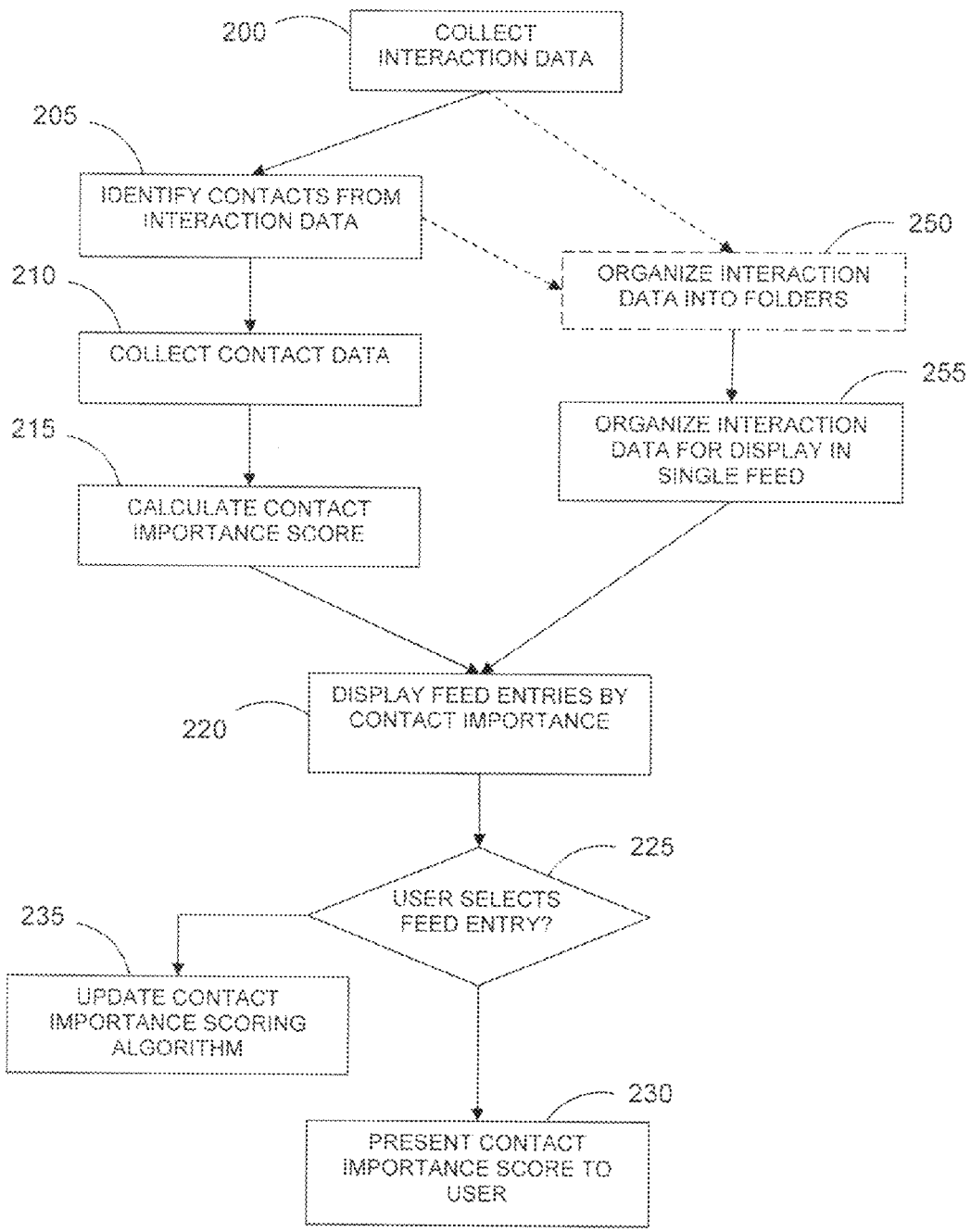
FIG. 2 is a flow diagram of a method of generating a contact importance scorecontact importance score in accordance with the present disclosure.

FIG. 2 illustrates a method performed by the web server 100 for generating and providing the contact importance score. The method may include, at step 200, collecting interaction data from one or more of the data stores 115-160. The interaction data may be any online content related to the user that can be obtained on an interactive platform. Interactive platforms may include social networking platforms such as TWITTER, FACEBOOK, PINTEREST, and the like; business listing and review platforms such as YELP! and GOOGLE Places for Business; online content platforms such as blogging platforms (WordPress, SquareSpace, Blogger, Tumblr) and newsfeed platforms (Reddit, RSS aggregators); email and other messaging platforms; and other platforms. In some embodiments, all or a portion of the interaction data may be private or semi-private, and the collection step 200 may include obtaining authorized access to the interaction data, such as by the web server 100 logging into the user's account and/or accessing the user's profile or newsfeed on the platform.

In particular, interaction data may include text, images, hyperlinks, and other HTML and metadata that make up a "post" that is directed at or mentions the user's business. Examples of posts include, without limitation: a direct message to the user via the user's email address or one or more of the user's social networking profiles (e.g., using an email client, a Short Messaging Service (SMS) or other cellular phone network and protocol, or a direct messaging client within a social networking platform (e.g., FACEBOOK Messenger)); a public or semi-private message directed at the user, such as a "tweet" or "retweet" between the contact's and the user's TWITTER profiles; a social network post, such as a FACEBOOK status update or new entry in an INSTAGRAM photo feed; a blog or other website article; a comment on a business listing (e.g., a YELP! review), an article, a social network post, or another source of relevant online content; and a reposting of content from the user's website or social networking profile, such as a FACEBOOK "share" or a link to the user's webpage. In some embodiments, the user may configure the web server 100 to collect interaction data that does not mention the user's business. For example, the user might configure the web server 100 to collect data from any post by a particularly important contact, even if the post does not pertain directly to the user's business.

The interaction data collected at step 200 may further include information pertaining to the entity (i.e., entity data) that authored or otherwise made available each collected post. In some embodiments, the entity data may include data that can be obtained from the entity's user profile on whichever platform hosts the post. Specifically, the entity data may include the entity's user name, real name or business name, email address or other contact information, geographic location, employer, and other biographical information as it may be obtained from the entity's user profile. It will be understood that the type of data that can be obtained may depend on the service (i.e., platform) that is hosting the relevant post. In some embodiments, the entity data may include such biographical data as described above, but obtained from another source. For example, the web server 100 may collect an identifier of the entity, such as a user name, real name, or email address, from the post itself, and then may search public records using the identifier to obtain the biographical information. In some embodiments, the web server 100 may itself search public records in the data stores 115-160 it can access. In other embodiments, the web server 100 may feed the identifier into a records retrieval service to obtain the biographical information.

At step 205, the web server 100 may identify one or more important contacts of the user's business from the interaction data. An important contact may include any or all of the user's past and current customers. Such identification may therefore include comparing the entity data within the interaction data to a database of the user's customers. In some embodiments, the web server 100 may search a customer contact database using an identifier of the entity contained in the entity data, as described above. For example, where the user keeps all of its customer contact information in an electronic rolodex (e.g., MICROSOFT Outlook contacts, FullContact, Data.com, Contactually, Plaxo, Factual), the web server 100 may identify whether the identifier for the entity is a match to any of the records in the electronic rolodex. In some embodiments, the web server 100 may identify whether an entity, thought not a past or current customer, is an important contact as either a "lead" (i.e., a potential customer) or an "influencer" of buyer behavior in the field of the user's business. An entity may be identified as a lead by analyzing its interactions with the user, with the user's competitors, or with its own social networks. Non-limiting examples of such analysis include: semantic analysis of direct interactions with the user on one or more of the user's platforms, such as to ascertain one or more characteristics of the user's relationship with the entity (e.g., the entity inquires about products or services of the user, or the entity has posted about the business on various platforms in the past); semantic or pattern analysis of the entity's interactions with competing businesses on their online platforms, such as repeated posts, shares, or "likes" of content on profiles of multiple competitors, which reflects interest in related products; and review of mutual contacts to determine if the entity has connections to the user's customers. An entity may be further or alternatively identified as an influencer by analyzing the entity's online "reach," such as the size of the entity's social networks, the frequency and level of engagement with the entity's posts related to the industry, etc.

At step 210, the web server 100 may collect contact data for one or more of the contacts identified at step 205. The contact data may include any of the data collected as entity data described above, and may further include data pertaining to the contact's past interactions with the user's business, and data pertaining to any factor of the contact importance score. Example contact data includes, without limitation: data related to purchase history, such as dates and amounts of purchases, products purchased and amounts thereof, and the like, as well as aggregate and/or trend analysis of such purchase data; data related to the contact's online interactions with the user and/or the user's business, such as an accounting of previous posts made by the contact to or about the business (including dates and content of posts); data related to the contact's online presence, such as website addresses, social networks on which the contact has a user profile, frequency of posts on any of the contact's online platforms, frequently visited websites, and the like; data related particularly to the contact's social networking presences (as it may differ from the contact's general online presence data), such as the number of friends, followers, or subscribers to the contact's user profiles or news feeds; and data related to any other relevant activities of the contact, such as whether the contact is a user of a particular service (e.g., GoDaddy Bookkeeping, described above). The contact data may further include a score or collection of scores for the contact generated by other scoring algorithms, such as a Klout social influence score.

From the collected contact data, at step 215 the web server 100 may calculate the contact importance score. Any suitable algorithm may be used to weigh elements of the collected data that correspond to the factors of the contact importance score. In an exemplary embodiment, the contact importance score may be comprised of eight equally weighted components, each graded on a scale of 1-10 and then averaged to determine a contact importance score of 1-10. The eight components correspond to the eight factors identified above: contact type; contact location; contact industry; contact purchase history; contact interactivity history; contact online reach; contact scores from other scoring algorithms; and contact usage of related services. A higher score indicates a better capacity to drive business to the user, and the capacity to drive business may be determined by the user's industry, location, age (i.e., its position in a typical business life cycle for its industry), or a combination thereof. In other embodiments, there may be more or fewer components, and the components may have different weights according to the factors that are more important to a particular business or industry. For example, contact importance for restaurants may heavily weight factors such as frequency of the contact's posts on platforms such as Yelp and Foursquare, number of followers the contact has who also post frequently on Yelp, and frequency that the contact mentions food topics on FACEBOOK, TWITTER, and other platforms. In contrast, contact importance for a hair salon may heavily weight customer influence on platforms such as Pinterest, Yelp, and FACEBOOK, and amount of followers that are within five miles of the hair salon. Furthermore, the web server 100 may adapt the weights of the components over time in response to the user's input (or lack thereof), as described further below, so that contact importance scoring more accurately reflects the goals of the user.

As illustrated, subsequent to the collection of interaction data at step 200, and in conjunction with the generation of customer importance scores, at step 250 the web server 100 may organize the interaction data into a folder structure that is conducive to the user's access. For example, the data may be organized by type of post (i.e., direct message, semi-private or public message, "mention" in a post), by platform or service, or by content. Examples of content classification include positive versus negative comments, requests for contact, and the like. In some embodiments, step 250 may take place after contacts are identified from the interaction data at step 205, and content classification can include classification by customer, business lead, influencer, etc. The organization step 250 may be optional, and may be skipped and the interaction data presented to the user in other formats, such as chronologically or by platform.

Figure 3:
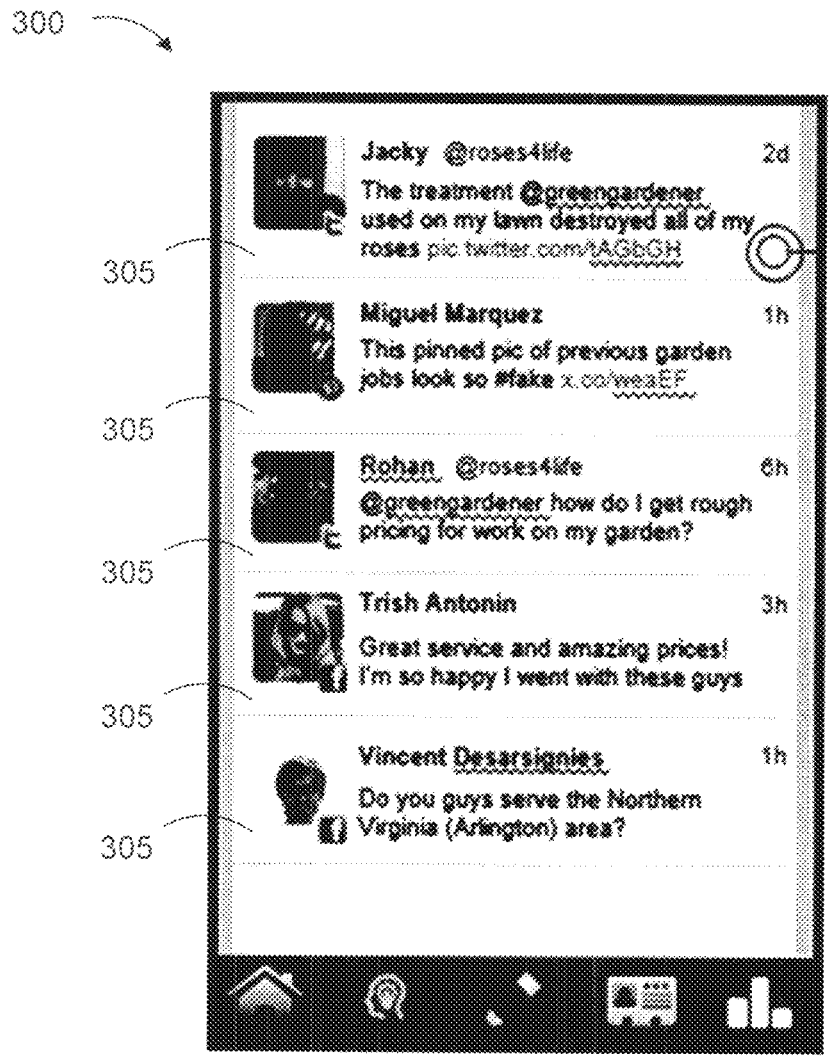
FIG. 3 is a diagram of a single feed of interaction data entries.

In some embodiments, at step 255 the interaction data may be organized for presentation to the user via display of a single feed. The single feed may include all of the interactions, presented agnostically in any suitable newsfeed format. By agnostic, it is meant that all interactions are presented in the same ordered list regardless of the platform or service from which the interaction data was collected. A suitable newsfeed format may comprise entries that display the identity of the posting entity, all or a portion of the posted content, and any other element of the interaction data that may be valuable, such as the time of (or time elapsed since) the posting or the platform or service on which it was posted. The single feed may be formatted for presentation on the user's device 105. An example display of the single feed for a smartphone is shown in FIG. 3.

Once the contact importance score(s) is(are) calculated (step 215) and the interaction data is organized for display in the single feed (step 255), at step 220 the web server 100 may display the entries for each interaction arranged sequentially in descending order of the posting entity's contact importance score. In this manner, the interaction data may be prioritized according to the posting entity's importance to the user's business. In some embodiments, the single feed may include or prioritize only entries for interaction data that has not yet been viewed by the user. The user may thereby rely on the single feed to determine the interactions that, according to the contact importance scoring algorithm, are most noteworthy to be reviewed and addressed. The example single feed 300 of FIG. 3 includes entries 305 arranged by contact importance score.

Figure 4:
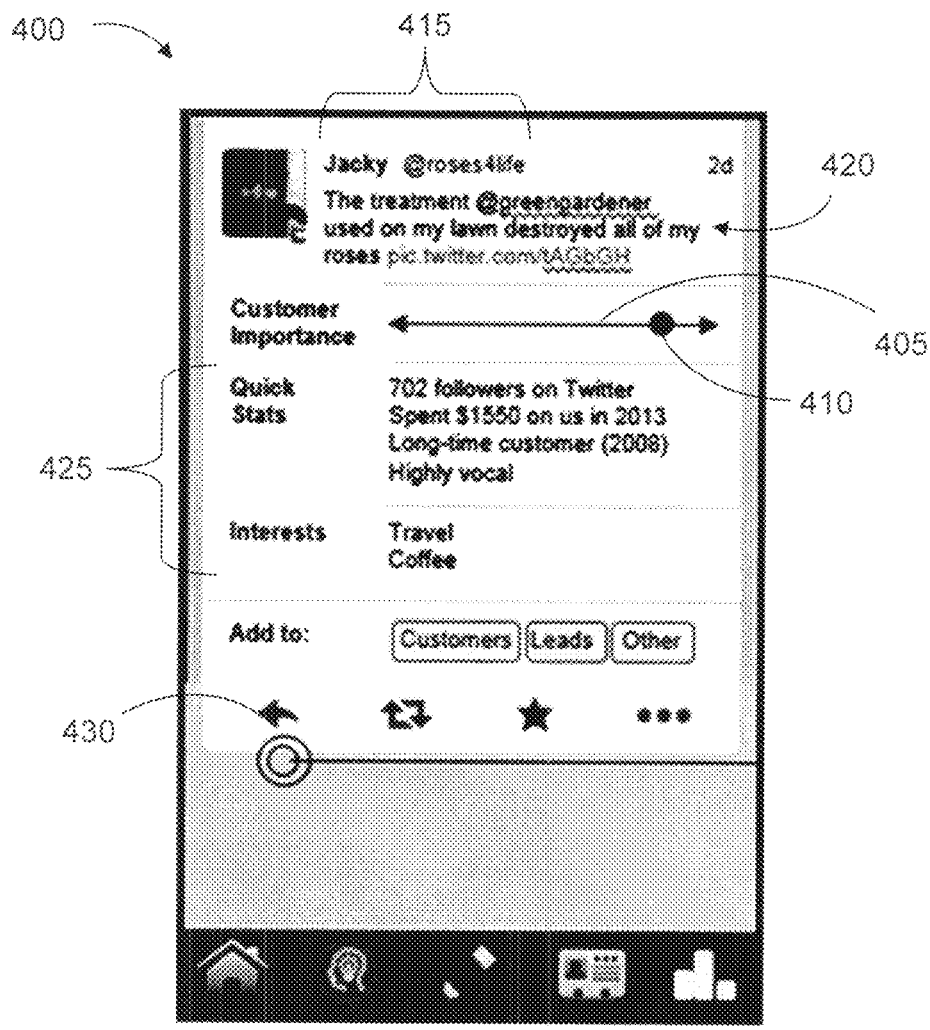
FIG. 4 is a diagram of an expanded display conveying a contact importance scorecontact importance score.

Presented with the single feed of interactions, the user may select any entry in the single feed to view an expanded display of the interaction data associated with that entry. At step 225, for any entry in the single feed, the web server 100 may determine whether the user selects the entry for further review. If the user does select the entry for review, the web server 100 may present the expanded display for the entry to the user. Referring to FIG. 4, the expanded display 400 may include the contact importance score for the contact that posted the interaction. The contact importance score may be displayed in any suitable format for conveying the score. In the illustrated example, the contact importance score is displayed as a slider bar 405 with a slider 410 indicating the score along the bar 405. Other suitable displays include numerical, color-coded, and the like. The expanded display 400 may further include additional details about the contact and her posted interaction. The additional details may include, without limitation: contact identifying information 415, such as the contact's name or username; the text 420 of the posted interaction; and a summary 425 of important data about the contact, such as details about the contact's purchase history, details about the contact's social networking reach, and biographical details such as a list of the contact's interests. The expanded display 400 may further include one or more action buttons 430 for taking action on the interaction. Example actions, as associated with the illustrated buttons 430, include replying to the contact's message, reposting the contact's message, marking the entry as important or a favorite (e.g., to indicate to the user to return to the entry later), and storing the entry in one of the folders described above.

Referring again to FIG. 2, if the user does not select the feed entry at step 225, the web server 100 may interpret the user's failure to select the entry as an indication that the interaction or entity associated with the entry is not as important to the user as was calculated at step 215. The web server 100 may wait for a predetermined amount of time to pass, or for a predetermined number of other entries to be selected, before determining that a particular unselected entry is not relevant to the user. In such a case, at step 235 the web server 100 may update the contact importance scoring algorithm, causing it to "learn" that the calculation for that contact is faulty for some reason. Over time, a collection of faulty calculations may exhibit commonalities in their data that the web server 100 may identify. The web server 100 may thereby improve the contact importance scoring algorithm by emphasizing or de-emphasizing factors or components of the score to produce more consistently relevant results.

Social Media Presence Analysis and Recommendations

The web server 100 may further use the interactive data, as collected at step 200 of FIG. 2 or as formatted into the single feed described above, to appraise the user's social media presence and to recommend actions that may improve the user's social media and other online presences. In some embodiments, the web server 100 may analyze the interaction data, either on its own or in combination with other web presence data or with comparative data, to produce an engagement score for the user. The engagement score may be relative to an ascertainable set of best practices for the user's industry. That is, businesses in different industries may use different online platforms with varying frequency to engage their customers and potential customers. For example, a hair salon may benefit greatly from sharing a large volume of high-resolution images (e.g., of hairstyles) with its online audience, and therefore may wish to post new content to its PINTEREST account more often than a restaurant or mechanic would use that service.

The aspects of an industry that are relevant to its online engagement best practices may include, without limitation:

type of goods or services sold, including the nature (e.g., platforms, fulfillment practices, frequency, volume, shipping and return policies, etc.) of typical online commerce in those goods or services; customer demographics, including age, gender, and geographic location; and geographic penetration, such as whether the industry is local (typically personal services such as barbers, dentists, massage parlors, and the like, but also small goods such as bookstores), metropolitan or regional (e.g., restaurants and breweries, amusement parks, museums), or super-regional (e.g., chain stores, franchises, and large retailers). In turn, the industry best practices for a business that are relevant to the user's engagement score may include, without limitation: platforms on which content is shared; content of user profiles on each platform; type and frequency of new content shared by the business; acceptance of interactions from followers (e.g., enabling public comments on a blog post); response time to interactions from followers; position and tone of the user's representative(s) (i.e., WHO is posting personal content (owner, manager, employees, etc.) and how does that person's online personality reflect on the business?); paid and unpaid advertisement placement and other marketing practices; and other aspects of best practices, which may depend on the industry.

The user's engagement score may further include comparative data of the user's online presence to those of its competitors. As described further below, the web server 100 may identify one or more of the user's competitors and analyze elements of the competitors' websites, social networks, and other online platforms. Suitable aspects for comparison may depend on the industry and its best practices, and may include, without limitation: presence on a particular online platform, and type and frequency of posts thereon; size of social networks (e.g., for a particular platform, number of followers in the first generation (i.e., direct) and second generation (i.e., followers of followers)); type and amount of common followers; frequency and content of views, shares, comments, reviews, etc., on competitor's profiles or posts; and business information, such as hours, products offered online or not online, prices, etc.

Figure 5:
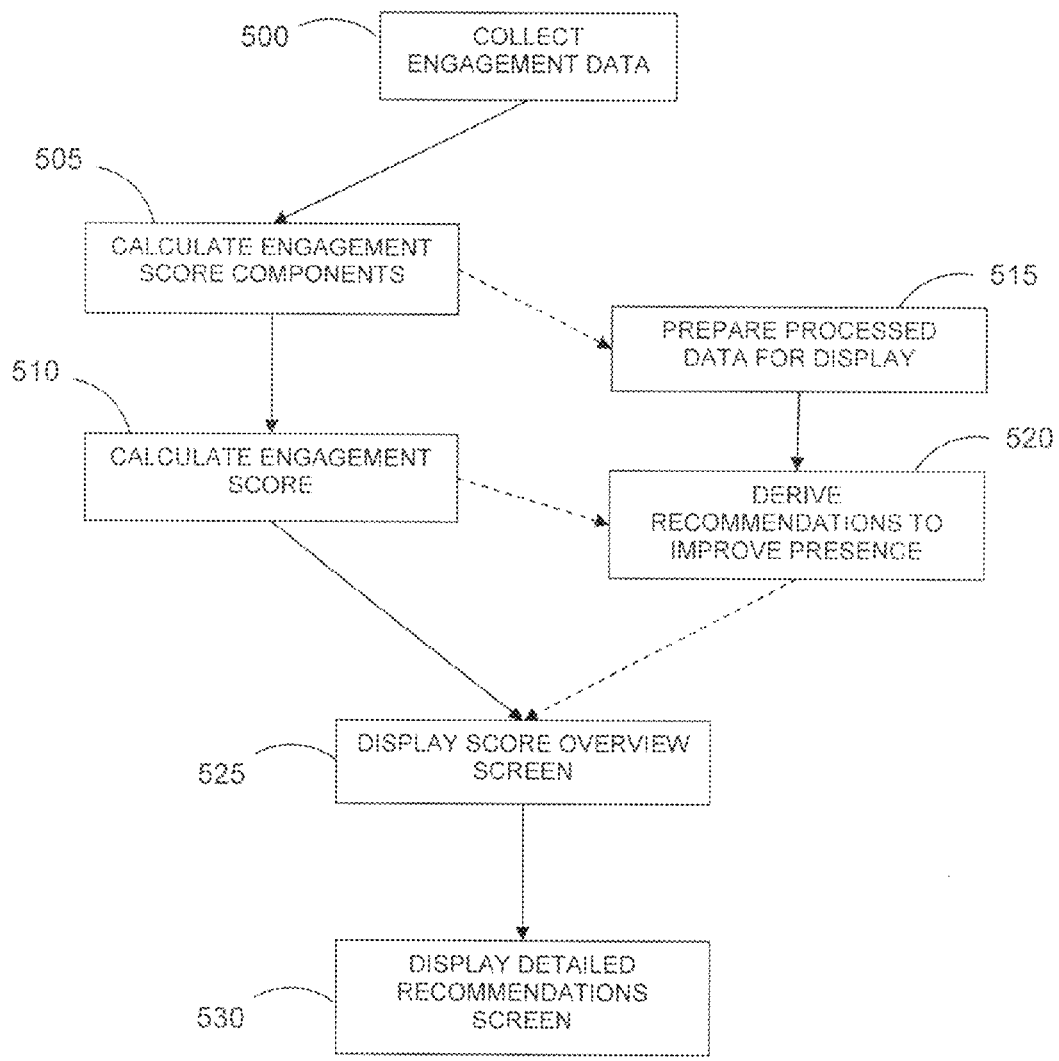
FIG. 5 is a flow diagram of a method of generating an engagement score in accordance with the present disclosure.

Referring to FIG. 5, to calculate and present the user's engagement score, the web server 100 may first collect engagement data, at step 500. The engagement data may include web presence data describing the user's web presence. The web presence data may include any data that the user has himself made available via an online platform (herein "user-posted data"). Non-limiting examples of user-posted data include the user's website, data from user profiles, postings of original content (e.g., blog posts, status updates, uploaded images, and the like), shared content (e.g., retweeted TWITTER posts or FACEBOOK shares), emails and sent personal messages, replies to messages, comments in conversations or threads, and other data posted by the user. The web presence data may further include any data mentioning, or otherwise relevant to, the user's business, which other entities have put online (herein "entity-posted data"). Non-limiting examples of entity-posted data include any of the interaction data described above with respect to the step 200, as well as data pertaining to the business which is not interaction data, such as online platform content identified through internet search analytics and searches.

Particularly regarding this search-identified content, the web server 100 may execute searches of any of the data stores 115-160 to collect information that is relevant to the business but may not mention the business. For example, the web server 100 may ascertain the industry of the user's business, and then may access or perform an analysis of high-traffic keywords that are related to the industry and are frequently used in internet searches, such as for products offered by the industry participants. The web server 100 may identify "hot" (i.e., currently popular or exceptionally high-traffic) keywords for the user's business, which may be all or a subset of keywords having a particular level of traffic. A subset of such keywords may be identified by narrowing the keywords, such as by traffic from certain geographic areas, by frequency of advertisements bought for the keyword, by frequency searched as an n-gram with other relevant keywords, and the like. The hot keywords and the top results in searches for the hot keywords may all be considered search-identified content to be included in the calculation of the user's engagement score.

Comparative data from competitors' web presences may be considered entity-posted data relevant to the user's business, and may therefore be identified as described above with respect to search-identified content. Alternatively, the web server 100 may perform a discrete process of identifying the user's business competitors and collecting data from identified competitors' web presences. Any suitable process of identifying competitors may be used, including those processes described in copending U.S. patent application Ser. No. 14/010,294, filed Aug. 26, 2013, entitled "METHOD FOR AUTOMATING SEARCH ENGINE OPTIMIZATION FOR WEBSITES," owned by Go Daddy Operating Company, LLC, and incorporated herein by reference. The web server 100 may access any suitable data store 115-160 to identify competitors and obtain comparative data. U.S. patent application Ser. No. 14/010,294 further describes suitable methods for extracting data from the competitors' websites (e.g., by scraping metadata and source code), which may also be performed on competitors' user profiles, blogs, news feeds, and the like, on any online platform to which the competitors' web presences extend. The comparative data may be the data extracted from the competitors' web presences, or the comparative data may be one or more metrics calculated from the extracted data for comparison to comparable metrics calculated from the user-posted data.

At step 505, the web server 100 may calculate, from the engagement data collected at step 500, one or more components of the engagement score. The components of the engagement score may each relate to an ascertainable best practice for the user's industry, as described above. Thus, the engagement score may be a standardized set of components that apply, to varying degrees, across all industries, or the engagement score may be a selection of components that are most significant to the identified industry. In one embodiment, the engagement score components include, without limitation: the frequency of posts to each online platform individually and/or in aggregate; number of posts per day comprising new, original (i.e., not shared from another source) content; average traffic to posts; average traffic to and/or clicks on advertisements; average number of interactions per day; average elapsed time to read and/or respond to contact interactions; total number of subscribers/friends/followers on each online platform and in aggregate; and demographic ratios, such as ratio of male to female followers and ratio among age groups or location.

At step 510, the web server 100 may calculate the engagement score by comparing each calculated component to its associated industry best practice, and then combining the resulting comparison data to produce the engagement score. The comparison data may be a percentage, a ratio, or a numerical value representing the difference between the calculated component value and the best practice value. For example: if the industry best practice is to post new content five times per day, and the user is only posting an average of four times per day, the user has an 80% score for that component; if the industry best practice is to respond to a contact's direct message within six hours, and the user is averaging five hours in response time, the user has a 100% score for that component (alternatively, the faster response time than best practice might be considered a negative, and the user may receive less than a 100% for the component (e.g., 84%)). If these two example components were the only components of the engagement score and were equally weighted, the calculated engagement score would be 90%. In some embodiments, however, the components may have different weights, and the weights may change over time in accordance with changing practices or trends in collected data, as described above with respect to calculating the contact importance score.

Figure 6:
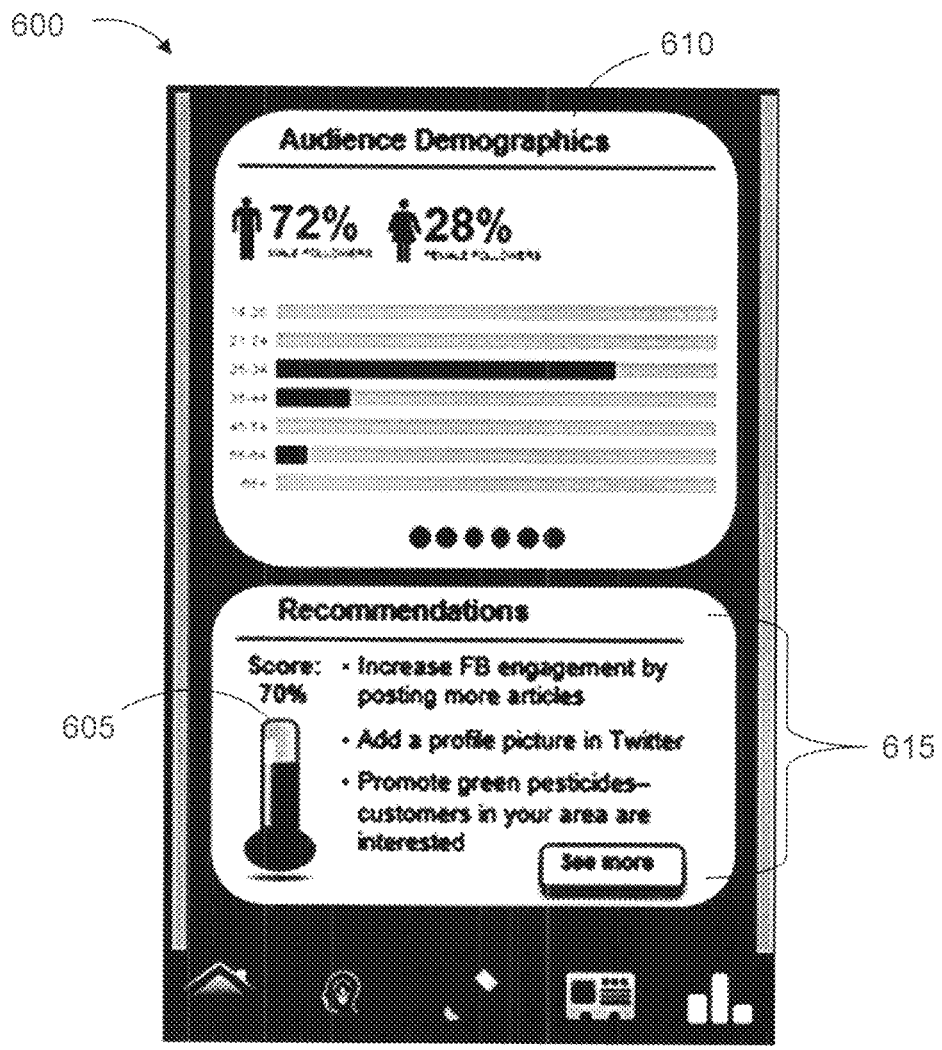
FIG. 6 is a diagram of a score overview screen conveying an engagement score.

At step 525, the web server 100 may display the engagement score to the user via the user's device 105. In some embodiments, the engagement score may be displayed on its own, while in other embodiments step 525 comprises displaying a score overview screen that includes the engagement score along with useful information that may be derived for the user by the web server 100 from the data collected at step 500. FIG. 6 illustrates an example score overview screen 600 presenting the engagement score in the form of a thermometer 605 displaying the engagement score as a percentage. The score overview screen 600 may further include audience demographics 610 for each platform or in the aggregate. The audience demographics 610 or other processed data that is extractable from the calculated engagement score components may be prepared for display, at step 515, such as by incorporating them into the score overview screen 600.

The score overview screen 600 may further include a recommendation summary 615. The recommendation summary 615 may list recommendations to the user for improving the user's online presence to better conform to industry best practices (and thus improve the engagement score), as well as to generally improve the information the user provides online. In some embodiments, the recommendations may be derived, at step 520, from the calculated engagement score. In such embodiments, the recommendations may be directed to improving the engagement score by bringing the user's practices more in line with the industry best practices for each component of the engagement score. Thus, the web server 100 may determine that a recommendation is needed if there is a deviation in the comparison data (i.e., the comparison data indicates less than a 100% score) for the component. In some embodiments, the deviation may be required to deviate at least a predetermined amount (referred to herein as a "recommendation threshold") before the web server 100 determines a recommendation is needed.

Figure 7:
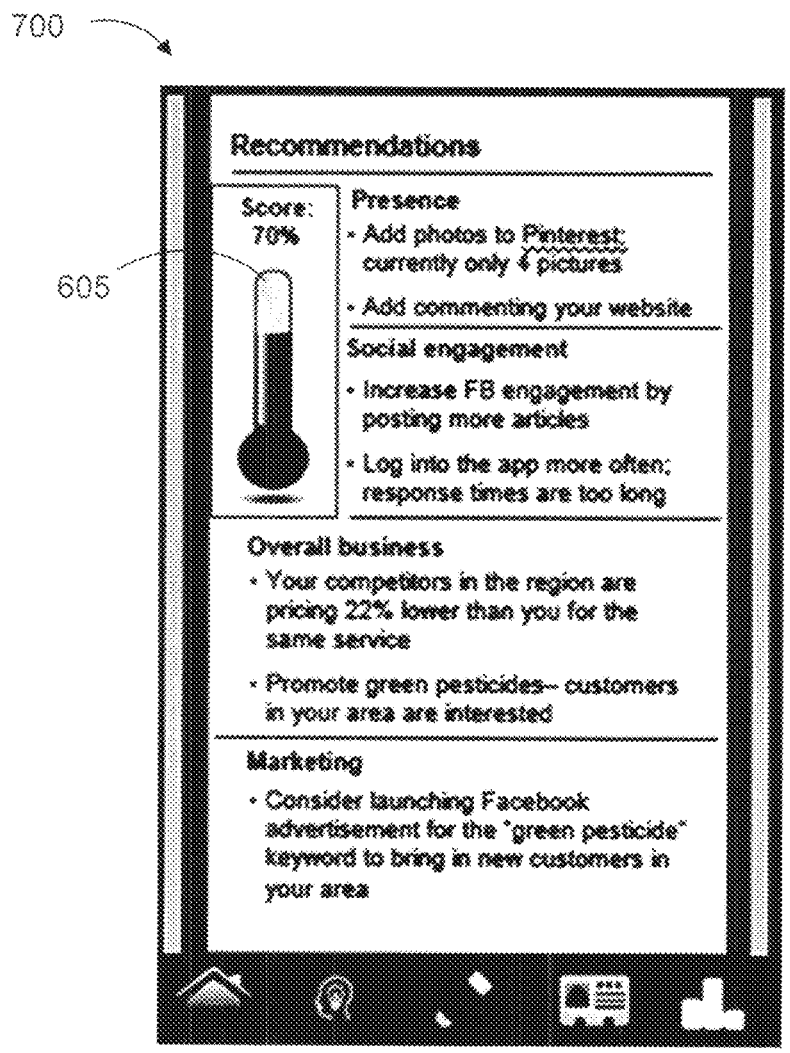
FIG. 7 is a diagram of a recommendations screen conveying recommendations for improving a user's web presence.

If a recommendation is needed, the web server 100 may review the comparison data to identify which analyzed factors within the component do not satisfy the industry best practices (i.e., meet or exceed the recommendation threshold). The web server 100 then generates a recommendation, which may be a recommended action that will bring the user's online engagement into line with the best practices. The recommendation may be displayed to the user in the recommendation summary 615 (step 525), or in a detailed recommendations screen 700, as shown in FIG. 7 (step 530). The example detailed recommendations screen 700 presents the engagement score thermometer 605, and presents the recommendations divided into sections that correspond to the components of the engagement score. Specifically, the sections relate to, but are not limited to: the user's general online presence, which may relate to the achievement of presence-development goals based on the life cycle of the business; the scope of the user's social engagement, which may relate to the amount and frequency of posts on the user's social network platforms, or the average amount of time to respond to social media interactions; business information, which may relate to analysis of the user's business information (operating hours, prices, offerings, etc.) in comparison to the competition or customer demands; and marketing strategies, which may identify hot keywords or areas for advertising based on search analytics. In practice, the recommendations may convey suggested actions, and if the user performs them, the user's engagement score will improve when it is next calculated.

In some embodiments, for one or more of the engagement score component calculations (step 505), the contact importance score calculation (step 510), and the derivation of recommendations (step 520), the web server 100 may take the "age" of the business (i.e., the stage within a typical lifecycle for a business in the relevant industry) into account and may adjust the scores or recommendations accordingly. Non-limiting examples of parameters by which the business age may be calculated include: the number of years the business has been operating; the business' annual or total revenue or number of customers; rate of unique customer contacts per day; total number of calls or purchases per day; number of business reviews on review platforms such as Yelp; annual expenditures, such as for marketing or shipping; movement of the business into a larger office, retail, or warehouse space; and, suitable combinations of such parameters. In some embodiments, the web server 100 may provide age-appropriate scores and recommendations according to the identified best practices of the industry of the business. In some embodiments, a framework of lifecycle stages may be applied to each industry. For example, a lifecycle framework may be divided into the following stages: idea; startup; emerging; established; expanding; and maintaining size. Suitable goals may be determined to meet the best practices of each industry at each stage. In one example of taking business age into account in the scoring algorithm, a company in the early stages of the business would have their score based on having a profile, making sure fields are populated, making sure they are on the right social networks for their business, etc. In one example of taking business age into account in recommending improvements to the user's web presence, a company in later stages might have recommendations on how to optimize its FACEBOOK cover photo to drive conversion, how to specify its "About Us" text to maximize SEO score and ability to get found online, etc.

Content Recommendations

To keep up with customer engagement and online best practices, a user may need to post fresh content to one or more online platforms multiple times per day. Users may quickly run out of content and may not have time to produce more. The web server 100 may further assist a user in maintaining his business' online presence and engaging customers and other entities with postings of new content by identifying and recommending, to the user, content for posting to one or more of the user's online platforms. According to the methods described below, the web server 100 may be configured to identify any type of content that should engage the user's audience; thus, the systems and methods herein facilitate sourcing of the user's online content from a single location: the web server 100.

As described throughout this disclosure, content may be any text, image, video, web page or hyperlink thereto, combination of the foregoing, or other suitable type of information published online. The web server 100 may identify any content, and in the method described below the content may be classified as "original" or "public" content. Original content is content created by or for the user, regarding a topic of the user's choosing (usually relevant to the user's business), that is unique to the user's web presence when the user first publishes it. Public content is content generated by a third party, not specifically for the user, which is found on another online platform and is initially published by a party other than the user. An example of original content is a blog post written by the user, and an example of public content is an article first published on time.com that the user shares on his FACEBOOK profile. Depending on the industry and age of the user's business, and the reach of the user's web presence, the user may find that either original or public content is more effective than the other at interacting with the user's audience. The present systems and methods analyze the user's content to identify and leverage its popularity in producing new content.

Figure 8:
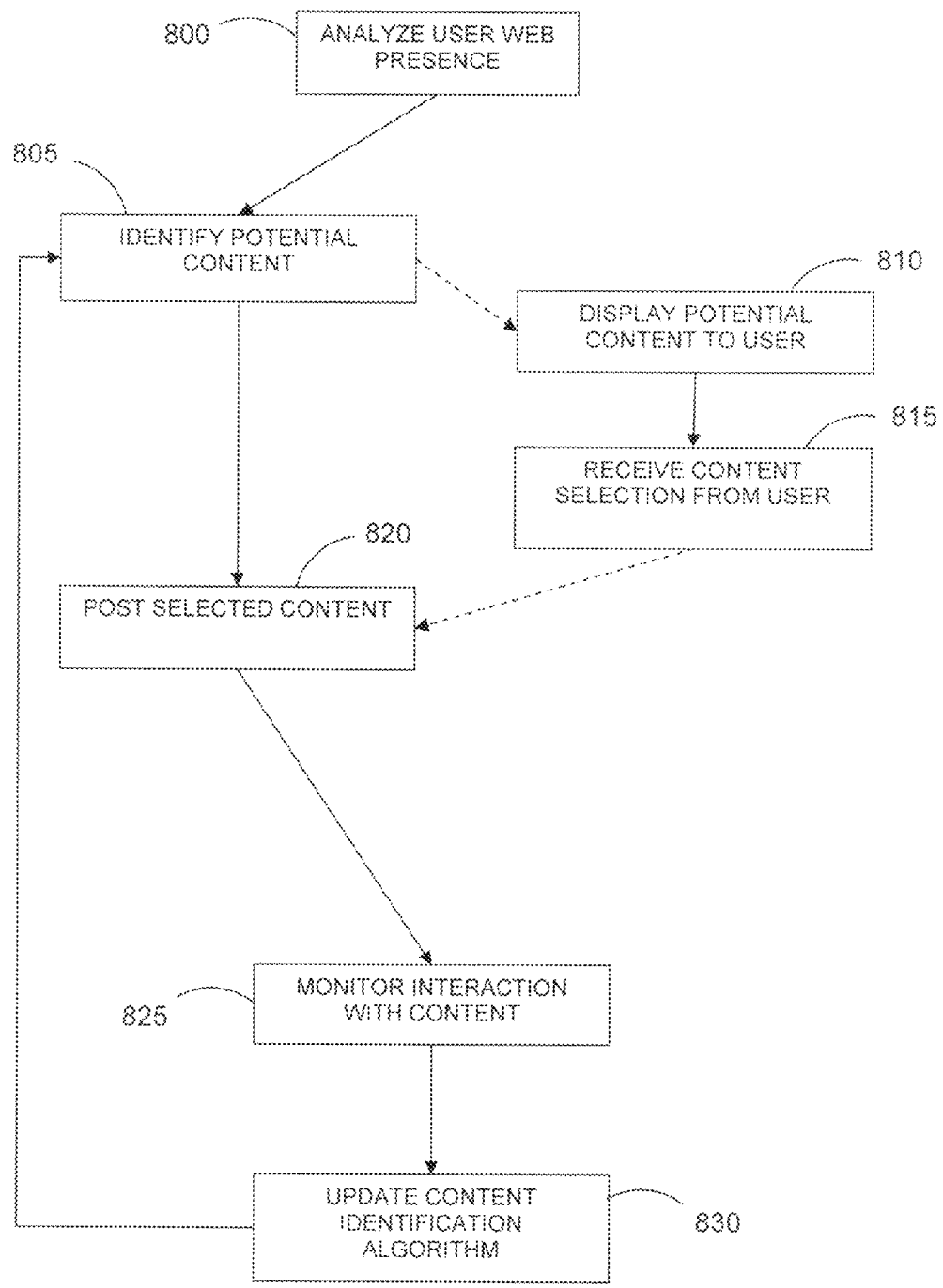
FIG. 8 is flow diagram of a method of recommending online content to a user in accordance with the present disclosure.

FIG. 8 illustrates an embodiment of a method performed by the web server 100 for identifying and recommending new content to the user. At step 800, the web server 100 may initially analyze the user's web presence to obtain "seeds" for identifying or generating content. The seeds may be information about the user's business, such as the business name and location, industry, names of products sold, prices, and the like. The seeds may further be keywords identified from web pages, profiles, and posts within the user's web presence. The web server 100 may perform any suitable method of collecting keywords from content within the user's web presence, including scraping HTML of web pages, performing word frequency analysis, etc. Through analysis of word use, as well as analysis of traffic to web pages or profiles, the web server 100 may weight keywords according to importance.

At step 805, the web server 100 may use the seeds to identify potential content for the user's web presence. The potential content may be any content suitable for publication on one or more of the user's online platforms. In some embodiments, the potential content may be classified as either public or original content. To identify public content, the web server 100 may search any suitable data store 115-160, such as by performing keyword searches on a search engine using the seeds, searching for occurrences of the seeds in news feeds within the user's social networks, and the like. To identify original content, the web server 100 may commission one or more content drafting services to generate articles of original content based on the seeds. Such content drafting services and their content generation processes are known in the art. For example, TextBroker engages thousands of authors that receive a request for original content (e.g., a blog post) on a topic and with a length and tone of the requestor's choosing, and draft the original content for a fee. In some embodiments, the web server 100 may provide a content type (e.g., blog post, status update, etc.), length, and the seeds to one or multiple content drafting services, and may receive one or multiple articles of original content in return.

Figure 9:
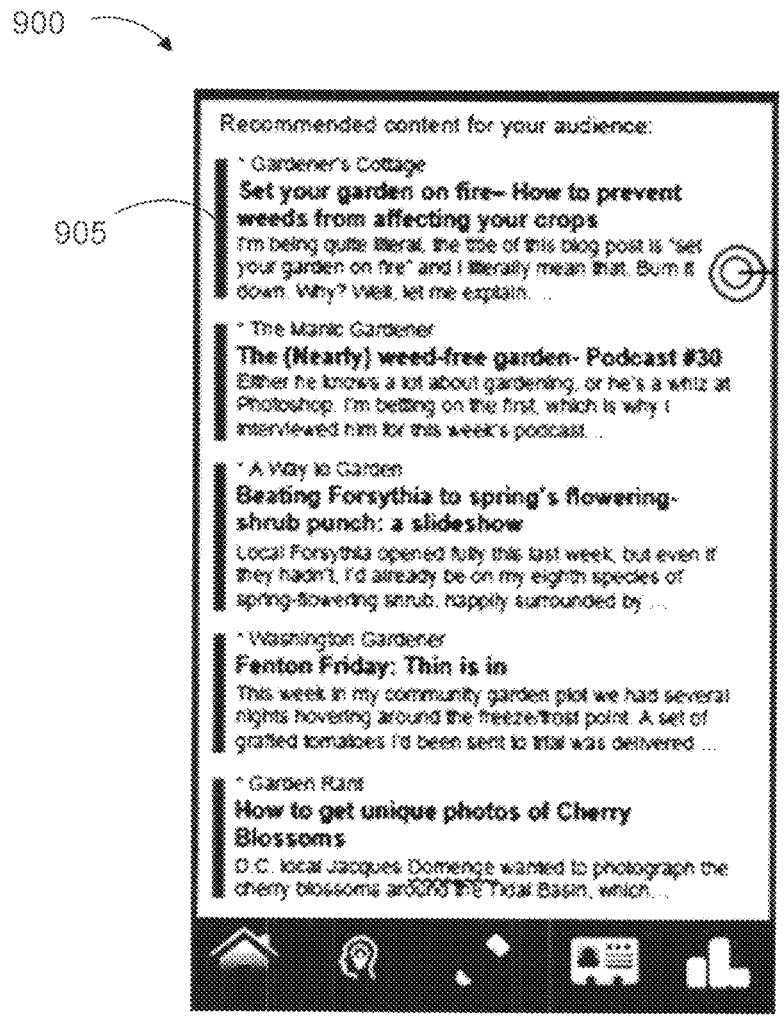
FIG. 9 is a diagram of a potential content feed conveying suggested content.
Figure 10:
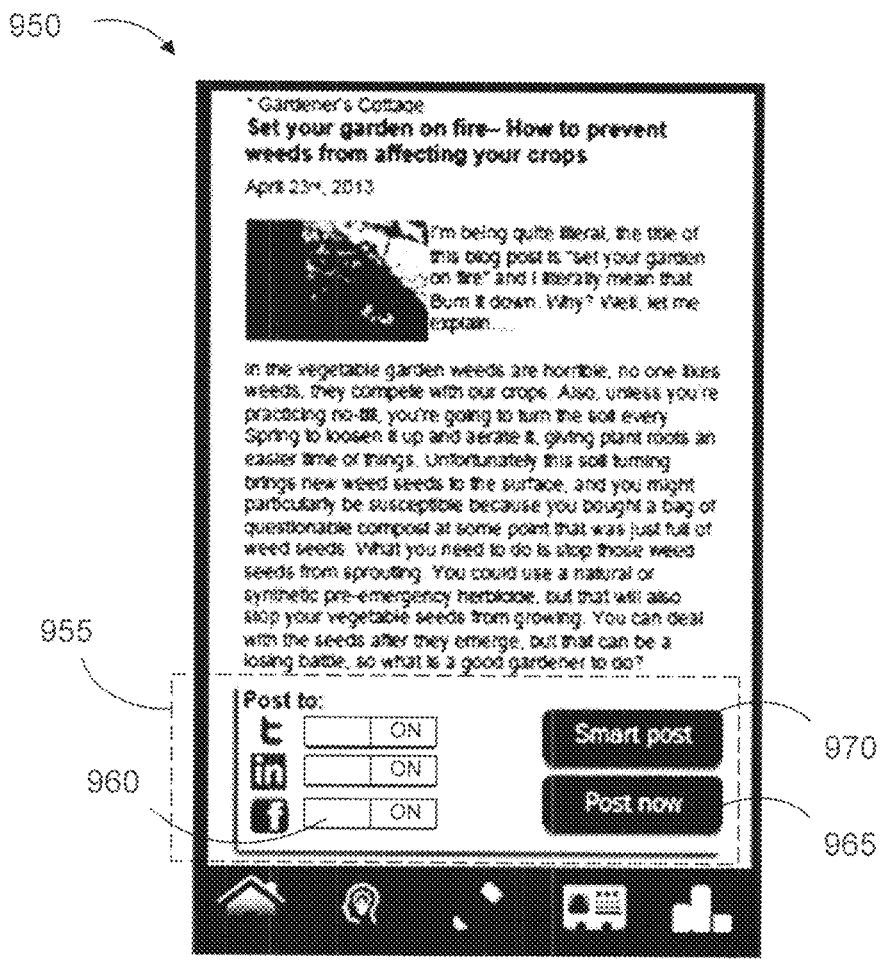
FIG. 10 is a diagram of a detail screen conveying the content of a suggested article and a post interface.

In some embodiments, the web server 100 may automatically post some or all of the identified content to the user's web presence as described below with respect to step 820. In other embodiments, at step 810 the web server 100 may display the identified potential content to the user for selection of which content to post. The web server 100 may aggregate all of the identified potential content and may identify each article by, for example: type, such as original or public; suitable platform(s) for publication (e.g., "all social networks" or "blog," or "FACEBOOK and TWITTER"); source of content; date first published; traffic to source post. As shown in FIG. 9, the web server 100 may present a potential content feed 900 arranging the articles (e.g., 905) in any suitable order and may list the source, title, and a brief summary, such as the first three lines of the article. The web server 100 may allow the user to select an article 905 from the feed 900 for a detailed view of the article 905 and posting options. FIG. 10 illustrates a detail screen 950 containing the full text of the article and a post interface 955. The post interface 955 may present posting options to the user and receive the user's selection. In the illustrated example, the post interface 955 displays the available platforms (TWITTER, LINKEDIN, and FACEBOOK) and a switch 960 for turning on or off the post to that platform. The post interface 955 further allows the user to select whether to post the content immediately (post button 965) or with a delay referred to herein as a "smart post" (smart post button 970). A request for a smart post instructs the web server 100 to post the content to the selected platforms at a strategic time in order to increase the post's exposure to all or a select subset of the user's audience. Strategic times may vary by industry—for example, a restaurant may receive most of its web traffic in the hour before lunch and the hour before dinner, while a mechanic may receive most of its web traffic early in the morning. Strategic times may also vary according to particular entities within the audience which the user especially benefits from reaching. For example, the web server 100 may track contact importance scores as described above, and may track the times of day that a particular contact with a high contact importance score typically engages with the user's content. The web server 100 may post "smart post" content during those tracked times of day. Strategic times may also be set manually by the user. In some embodiments, potential content that does not get selected by the user may be retained by the web server 100. The unselected content may be made available to other users via their unique instances of the post interface 955.

Referring back to FIG. 8, at step 815 the web server 100 receives the content selection from the user via the post interface 955. At step 820, the web server 100 may post the content according to the user's selections. That is, the web server 100 may post the selected content to the selected platforms immediately, or at a strategic time set by the user or identified by the web server 100. At step 825, the web server 100 may monitor interaction of the user's audience with the posted content. The web server 100 may track any type of interaction with the content, such as views, amount of time spent viewing, whether particular contacts viewed, other links within content followed, products purchased, shares by viewers and new traffic therefrom, comments, and the like. In some embodiments, tracking the interaction may include collecting interaction data as described above with respect to step 200.

At step 830, the web server 100 may use the information collected by monitoring the interactions to update the algorithm it uses to identify content. In some embodiments, the web server 100 may adjust the ratio of original content to public content that it identifies as potential content, based on which type of content receives better quality or quantity of interactions when posted by the user. In some embodiments, the web server 100 may identify keywords within particularly popular (i.e., widely viewed, widely shared, high volume of comments, or any other suitable relative metric for comparing interactivity with posts) posted content and may weight those keywords higher as seeds in subsequent potential content identification (step 805). The web server 100 may then return to the content identification step 805 to continue identifying potential content using the updated algorithm.

Website Builder with Social Engagement Analysis

The social engagement analysis and content recommendation tools described above may be provided to the user via the described interface for one or more user devices 105. In some embodiments, the interface may be provided in one or more standalone software applications, including smartphone or web-based applications that perform one or more of the described functions. In some embodiments, the interface may be provided to a user of a website building tool that can facilitate initial generation of the user's website, as well as continuing updates of the website and of the user's presence on other online platforms as the user provides access to them.

Figure 11:
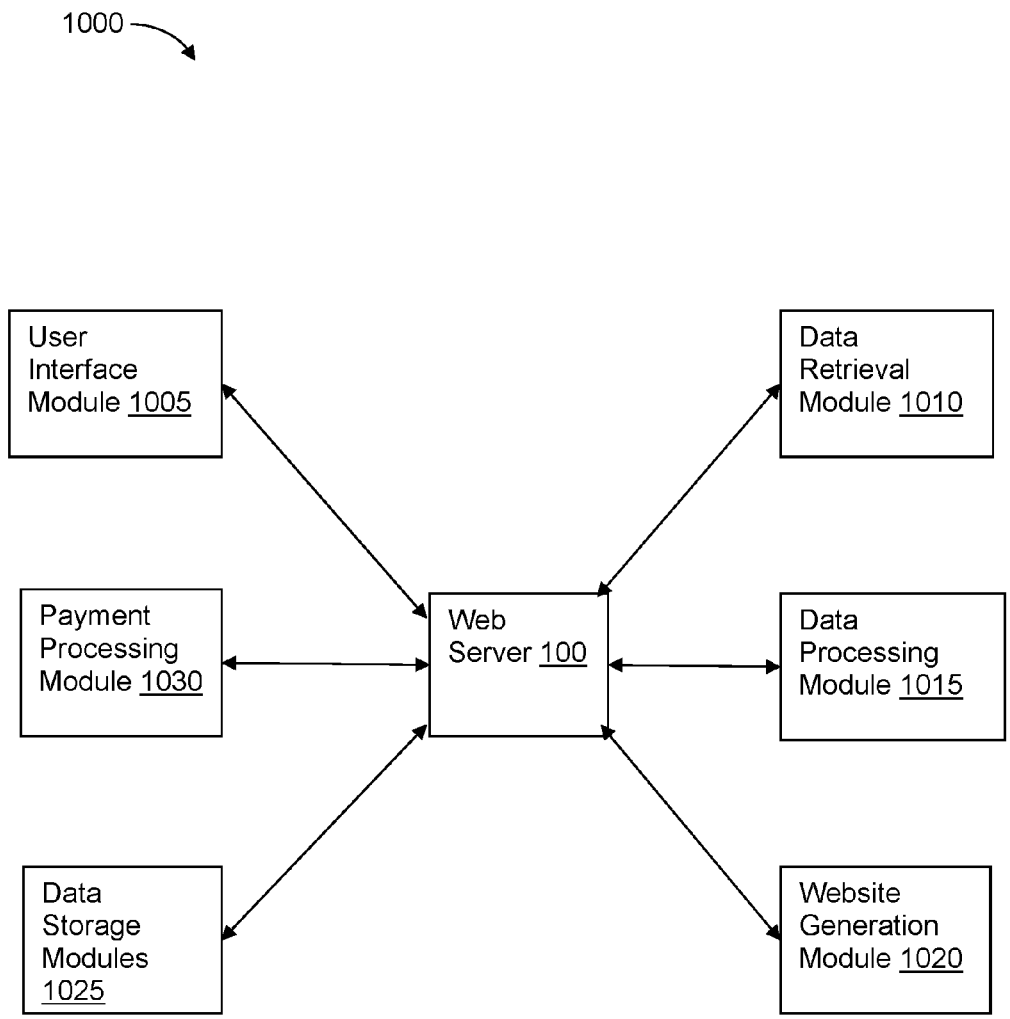
FIG. 11 is a block diagram showing the functional components of a system for generating websites according to the present disclosure.

Referring to FIG. 11, a system 1000 for performing the website building and social engagement analysis methods described herein may include the web server 100 and a plurality of modules for performing one or more steps of the methods. The modules may be hardware or software-based processing modules located within the web server 100, in close physical vicinity to the web server 100, or remote from the web server 100 and implemented as standalone server computers or as components of one or more additional servers or of one or more other computing devices, such as a payment terminal or cash register. The modules may include, without limitation: a user interface module 1005 for providing input/output capabilities between the system 1000 and the user; a data retrieval module 1010 for performing searches of data stores; a data processing module 1015 for evaluating retrieved data, comparing retrieved data to other data, performing score calculations, and the like; a website generation module 1020, which may be a component of the data processing module 1015 or a separate module, and which creates web pages and posts new content thereto; one or more data storage modules 1025 for storing the data retrieved by the data retrieval module, content objects created by the data processing module 1015, and the website generated by the website generation module 1020; and a payment processing module 1030 for processing payment information provided when a user chooses to purchase a generated website, generated content, or other elements of data generated via the methods herein.

The website builder may be any suitable website building application that may be configured to perform or to be compatible with the methods described herein. In one embodiment, the website builder is the GODADDY Website Builder. In some embodiments, the website builder may use a grid layout for what-you-see-is-what-you-get web page building, in which the user may drag, drop, resize, change properties, and otherwise edit web page elements in an environment that reflects what the web page will actually look like when it is published. The grid helps a user align elements on the web page and may be set at any suitable resolution. In other embodiments, the website builder may not use a grid.

Figure 12:
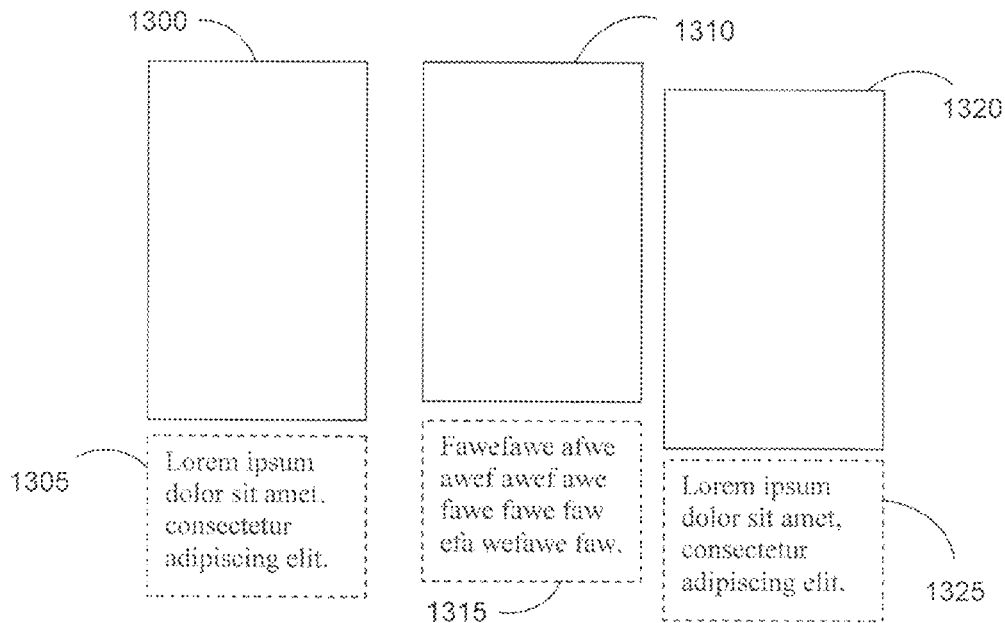
FIGS. 12-17 are schematic diagrams demonstrating alignment of misaligned website content in a website builder interface.
Figure 13:
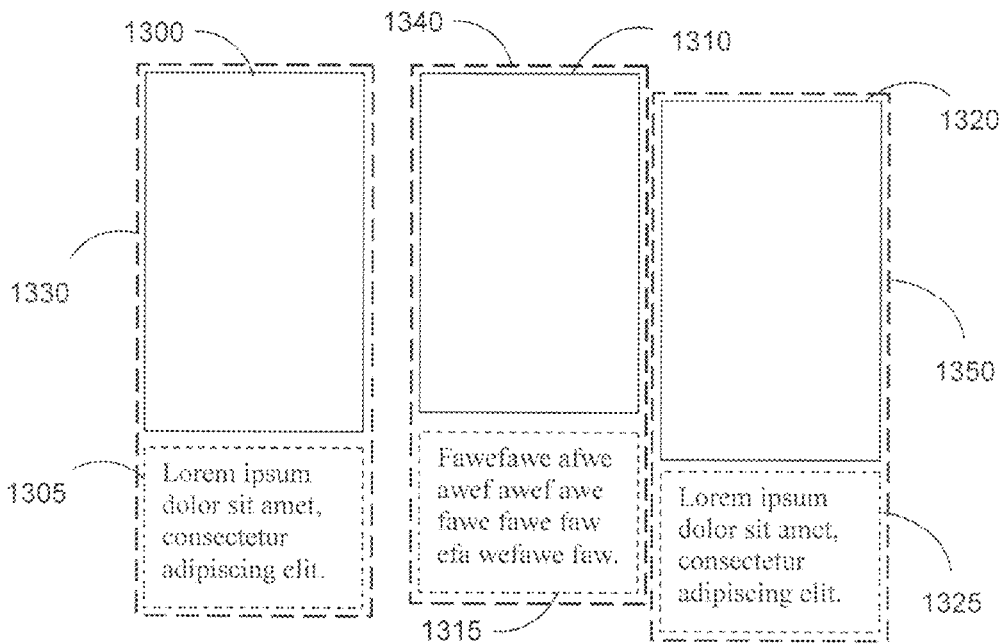

With or without the aid of a grid, users frequently find that a web page design that appears ready to publish is actually fraught with slight misalignments. For example, as shown in FIG. 12: a first image 1300 has a first caption 1305 below it; a second image 1310 adjacent the first image 1300 is aligned with the first image 1300 at the top, and the second caption 1315 below the second image 1310 is the same size as the first caption 1305, but the second image 1310 is slightly shorter (e.g., three pixels shorter) than the first image 1300; and, a third image 1320 and third caption 1325 are the same size as the first image 1300 and first caption 1305, but are misaligned (e.g., by about three pixels) with the first image 1300 vertically. The misalignments may not be perceived by the user, or the user may notice them but prefer not to spend the tedious effort to perfectly align all of the content. The present disclosure thus provides methods for automatically aligning web page elements and groups to correct these imperfections.

Figure 16:
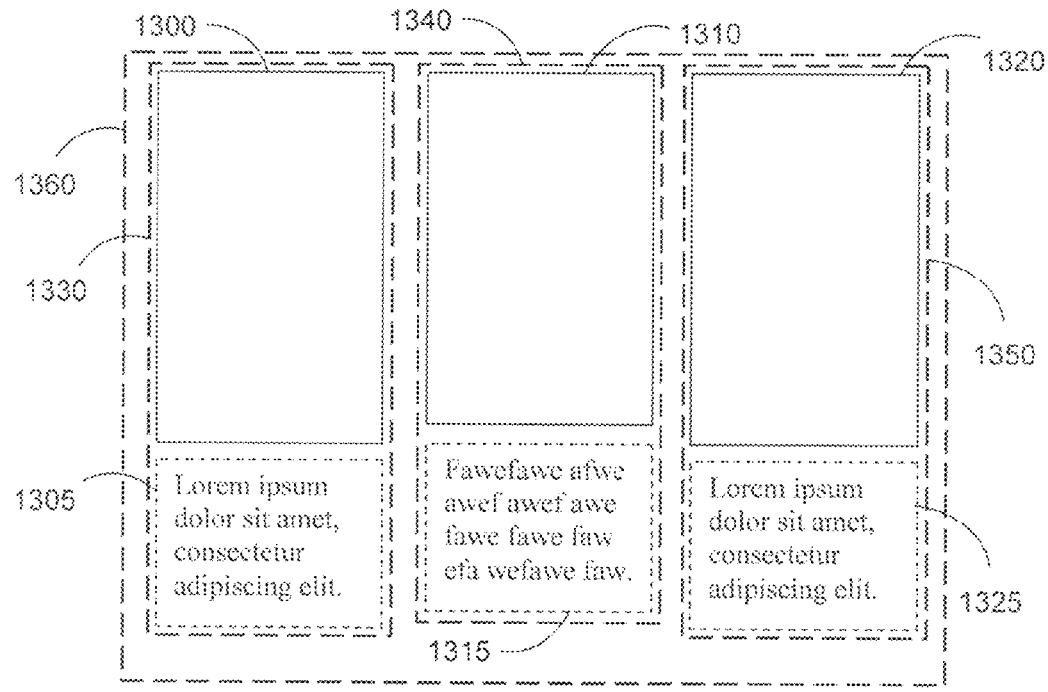
Figure 17:
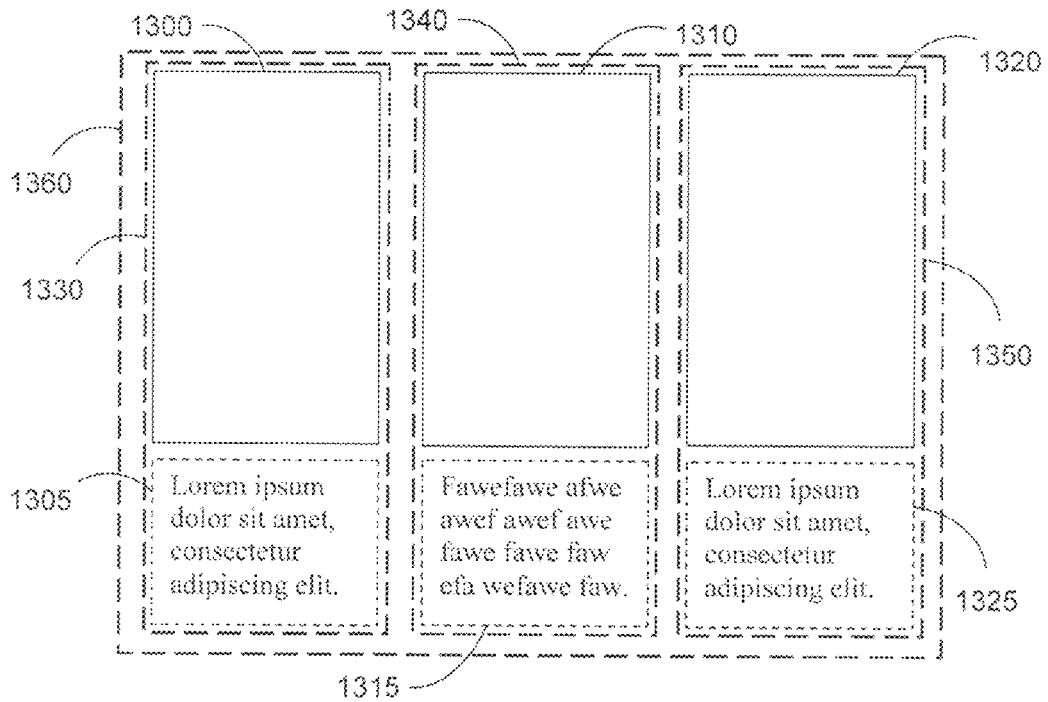
Figure 18:
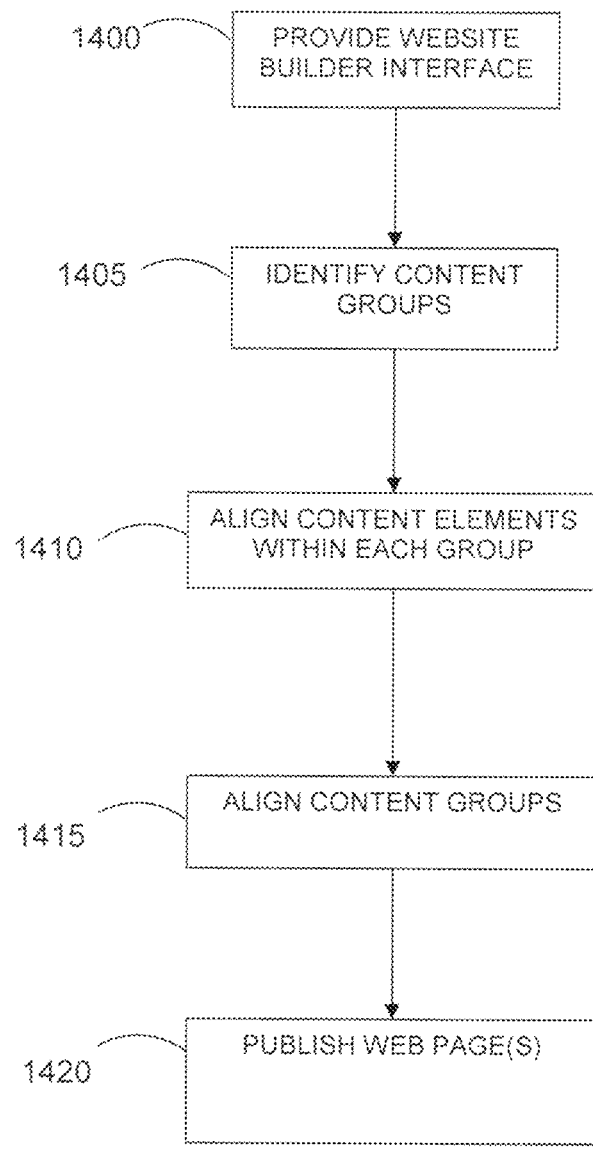
FIG. 18 is a flow diagram of a method of aligning website content in accordance with the present disclosure.

FIGS. 13-17 demonstrate alignment of the misaligned content of FIG. 12 using an embodiment of an alignment method illustrated in FIG. 18. At step 1400 the web server 100 may provide a website builder interface (see FIG. 12) to the user, through which the user can build one or more web pages. The interface may include an "auto-align" button or check box to instruct the web server 100 to perform the subsequent steps of the method of FIG. 18. In some embodiments, the user may click "auto-align" one or more times during the building process, and the web server 100 will align the current elements in the page layout each time. In some embodiments, the auto-align button or checkbox may be provided in conjunction with a "save" or "publish" button, so that the auto-alignment is performed once the page layout is finalized. In any case, before or during publication of the web page, the web server 100 receives an instruction to auto-align the web page elements as described below.

At step 1405, the web server 100 may analyze the elements placed within the page layout to identify groups of elements that are intended to be displayed in contextual relationship with each other. The web server 100 may analyze both the source code of the web page and the graphical layout divorced from the source code, reading contextual indicators that the elements should be grouped together for alignment as described below. Contextual indicators in the source code may include identical or similar element properties (e.g. cascading style sheet (CSS) class), absolute or relative positioning in approximately the same column or row of pixels, placement within common or similarly structured <table>, <span>, or <div> HTML tags, same or related element types, and the like. Contextual indicators may depend on the element type as well. For example, in determining whether two images on the web page should be grouped, the web server 100 may analyze both their position relative to each other and their size (i.e., width and height). Contextual indicators may include a mapping of the web page graphical layout against one or more standard web page structures. For example, the illustrated web page layout includes a standard layout of an image over a text block (i.e., a caption), forming the groups 1330, 1340, 1350 of FIG. 13, and a standard layout of image/text block groups aligned horizontally across the page.

Figure 14:
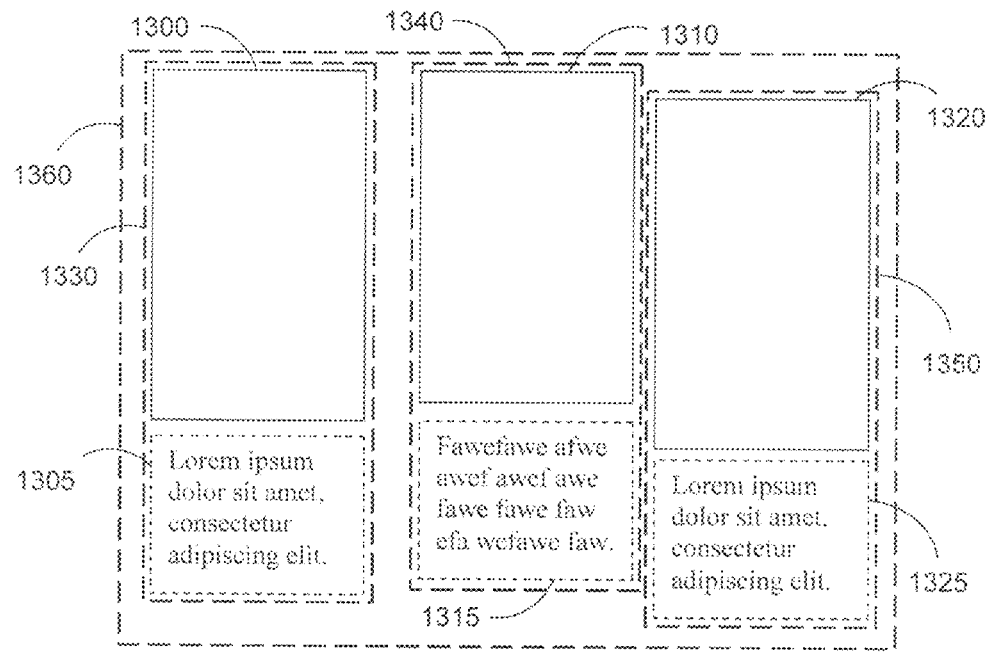
Figure 15:
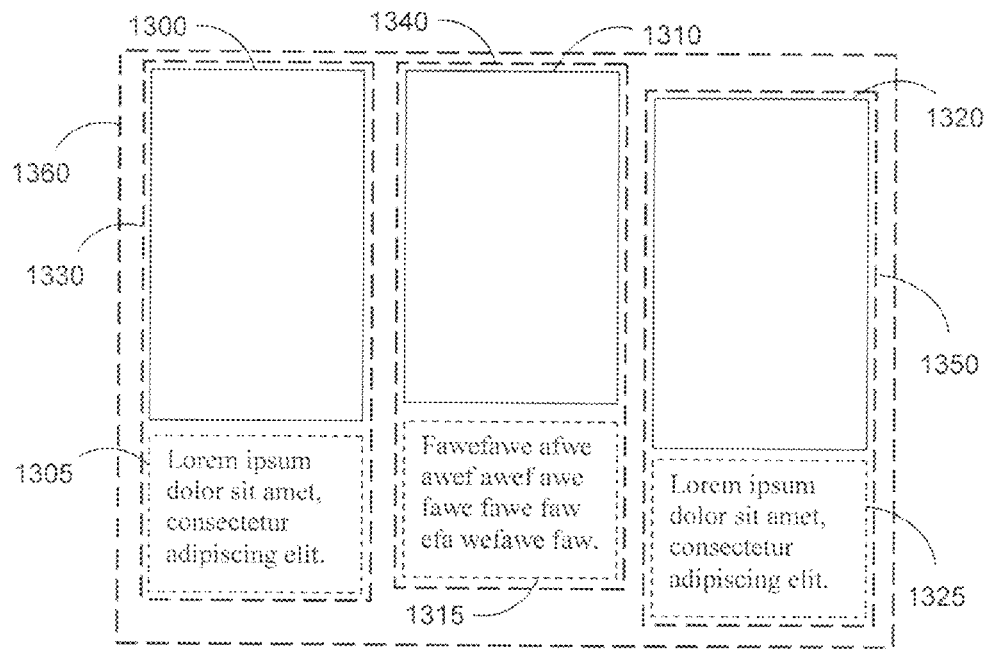

Elements can be in multiple groupings and may depend on other elements. In these cases, elements may be given a parent-child relationship with a defined set of attributes. Other similar parent-child entities may also be assigned the same set of attributes. Groups may also be nested, such as is illustrated in FIG. 14 where the identified groups 1330, 1340, 1350 are then grouped together in a "family" group 1360 corresponding to the standard layout of the groups 1330, 1340, 1350 aligned horizontally across the web page.

At step 1410, the web server 100 may align the elements of each group relatively to each other. Where the web builder can apply a grid to the layout, the web server 100 may use the grid to determine the elements' spatial relationships to each other, such as distance and alignment. Otherwise, the web server 100 may determine spatial relationships using any suitable measurements, such as raw pixel count between elements or differences in absolute position values. In some embodiments, the web server 100 may apply one or more thresholds to determine whether the user intended to align two elements across the top, bottom, or sides. Thresholds may pertain to dimensions and distances of the elements relative to each other, to the grid lines, or both. Example thresholds include, without limitation: a distance threshold related to the distance between two elements; a size threshold related to a size difference between two elements; and, an alignment threshold related to a vertical or horizontal distance between corresponding edges (e.g., tops, left sides) or between horizontal or vertical centerlines of two elements. In an example, if the alignment threshold is five pixels, and the first image 1300 is aligned with a grid line across its top, and the top of the second image 1310 is less than five pixels from that grid line, the web server 100 may determine that the first and second images 1300, 1310 should be aligned across the top. In another example, if the size threshold is three percent, and the second image 1310 has the same width as the first image 1300 and is less than three percent shorter than the first image 1300 (as illustrated in FIG. 12), the web server 100 may determine that the first and second images 1300, 1310 should be the same size.

The web server 100 may then correct the alignment of any elements, such as by modifying the source code of one or more web pages of the website. For example, to increase the height of the second image 1310, the web server 100 may read the original height of the first image 1300, and then set the height of the second image 1310 equal to that of the first image 1300.

At step 1415, the web server 100 may align the groups with each other. In some embodiments, the web server 100 may find the edges (top, bottom, and sides) and centerlines of each group to facilitate alignment. The web server 100 may align a first of the groups, such as the topmost, leftmost group, to the grid first. Subsequently, the web server 100 may follow any of the alignment steps recited above to identify groups that should be aligned with each other, and then to align the groups. The illustrated web page layout demonstrates several examples. In FIG. 14, the groups 1330, 1340, 1350 of the family group 1360 are determined to be non-uniformly spaced horizontally, and the middle group 1340 is moved to the left to uniformly space the groups 1330, 1340, 1350 (see FIG. 15). Then, the rightmost group 1350 is determined to be vertically out of alignment with the other two groups 1330, 1340 and is moved so that its top edge aligns with those of the other groups 1330, 1340, as shown in FIG. 16. Finally, the bottom edge of the middle group 1340 is determined to be out of alignment with the other two groups 1330, 1350; through element analysis as described above, the second image 1310 is determined to be shorter than the other two images 1300, 1320 and its size is increased accordingly. These steps result in a final alignment of the groups 1330, 1340, 1350 as shown in FIG. 17. With all groups and elements aligned, at step 1420 the web server 100 may publish the web page(s).

The website builder may further have a video production module (herein "video producer") that aids the user in producing video content (herein "videos") for the user's website or other online platforms. The video producer may be a standalone module of the system 1000, or it may be component of another module, such as the data processing module 1015 or website generation module 1020. The video producer may create videos based on content obtained from the user's web presence, including the website built or under development within the website builder application. Upon publication of the website or completion of the video, the video producer may publish the video to one or more of the online platforms. In some embodiments, publication of the video may improve search engine indexing of the video and the web page(s) on which it appears.

Figure 19:
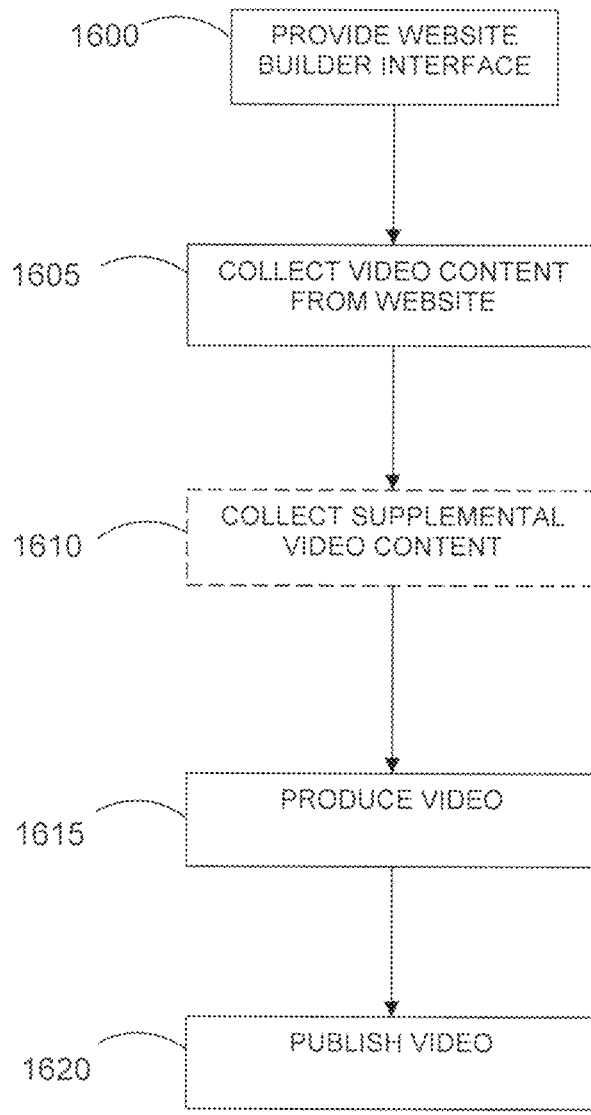
FIG. 19 is a flow diagram of a method of creating a video for a user's business in accordance with the present disclosure.

The web server 100 may be configured to generate a video having any suitable purpose or message. Examples include an introduction or overview of the user's business, an instructional video for a product, a video tour of a space (e.g., the user's store), and the like. FIG. 19 illustrates an example method of generating a "profile" or overview video using website elements added to the website builder application. At step 1600, the web server 100 may provide the website builder interface as in step 1400 described above. At step 1605, the web server 100 may collect video content from the website elements added by the user to the website via the website builder interface. Step 1605 may be performed during the website layout process. That is, the web server 100 may collect the video content as the user is building his website in the website builder application. Alternatively, the web server 100 may collect the video content after the user has finalized the website design and is ready to publish or has published the website. In another embodiment, the web server 100 may collect the video content from a published website using any suitable content scraping algorithm to obtain the video content described below.

The video content may include theme data and presentation data. Theme data may include data that provides a unifying look and feel, or background, for the presentation data. Theme data may include business logos, color schemes, fonts and typesets, design elements such as lines, curves, and shapes, sound files or streams, element layouts, and the like. Theme data may be extracted from text or graphic elements uploaded, drawn, or typed by the user, as well as from the source code of the web page. The web server 100 may identify primary themes from the theme data by frequency or prominence analysis. Frequency analysis may include a count of the times an element of theme data is repeated on a web page or across the user's website as a whole. For example, if an image serves as a background image for every web page on the user's website, the web server 100 may identify the two or three most used colors in the image as the color scheme of the website. The web server 100 may use any suitable method for identifying frequently-used colors, such as by counting pixels having a certain color value (i.e., a certain RGB or CMYK value) or range of values. Prominence analysis may include an identification of the theme data elements that are displayed in the typically most-viewed locations of a web page. For example, the web server 100 may identify business logos and color scheme(s) from the masthead of a web page, and may identify the most important typesetting from the masthead and/or headers on the web page. In some embodiments, the web server 100 may identify fonts or typesets from the source code of the web page, or by performing optical character recognition of images on the web page and font comparisons of any text identified in the images to know fonts or typesets.

Presentation data may include data that conveys descriptive content about the business to viewers. Presentation data may include text (e.g. headers, paragraphs, etc.), images, slideshows, video clips, information from interactive web applications, information in hyperlinks (e.g., web addresses) or from hyperlinked content, and the like. The web server 100 may identify elements of presentation data by content type, such as text, image, video, etc. The content type may be identifiable from HTML tags in the web page source code, from a filename of the element (e.g., "store_photo.gif" may be identified as an image by its file extension), or from element type indicators used within the website builder program. In an example of the latter, the website builder interface provided at step 1600 is a drag-and-drop environment, where the user selects the type of content to add and drags a new element into the design environment to insert the element into the web page; the web server 100 tracks the content type of the added element. The web server 100 may further identify elements of presentation data by more informational categories. For example, text may be identified as title, header, paragraph, and the like, according to its HTML tag.

The web server 100 may identify organizational details describing the presentation data elements. Organizational details may include the web page title or template (e.g., home page, "about us" page, contact page, menu/product list page) from which the element was obtained, placement on the web page (e.g., masthead, center, bottom), whether the data element was emphasized (e.g., by italicized or capital letters, relatively larger font, or different font or background color from surrounding elements), and other information about how the presentation data is organized that may indicate which data elements are prominent and should be included in the video.

At step 1610, the web server 100 may optionally collect supplemental video content that includes theme data and/or presentation data obtainable from another data source outside of the web page, such as from any of the data stores 115-160 accessible by the web server 100. For example, the web server 100 may collect presentation data from social networking platforms on which the user has an account or profile or from an online business listing data store (e.g., YELP!) on which the user's business is listed. Such presentation data may be obtained from interaction data collect (e.g., at step 200) as described above. In some embodiments, the supplemental presentation data may include stock images, video, or other video content that the web server 100 may obtain from a stock content data store. The web server 100 may obtain suitable stock content by identifying the industry of the user's business and searching for relevant stock content.

In some embodiments, the web server 100 may store the theme data and presentation data as records in a database. The records may be arranged in a data structure that facilitates creation of the video. In some embodiments, certain data elements, such as the business name and industry, may be required for video creation, and the data structure may include a record for each required element. Another content requirement may be a predetermined amount of text or video data that is sufficient to create a video of a desired length. For example, the web server 100 may be required to collect at least 150 words from paragraph tags on the website to create a voiceover or readable text overlay for a 30 second video. The web server 100 may continue to collect content at steps 1605 and 1610 at least until it stores theme data or presentation data in each of the required element records.

At step 1615, the web server 100 may produce the video. In some embodiments, the theme data and presentation data may be stitched together with audio, small animations, etc., using any suitable video production technique. Based on the intent and context of how an image or text is used on each web page (e.g., items on a page titled "menu" may be displayed differently than pictures in the "About us" page), the video may modify the display of data collected from each of those web pages. In one embodiment, the web server 100 may engage a video production server to create the video. The video production server may be operated by the web server 100 or by a third party. For example, the web server 100 may format the collected theme data and presentation data for use by the ANIMOTO video creation service, and may transmit the formatted data to a video production server operated by ANIMOTO. The web server 100 may then receive the completed video from ANIMOTO.

At step 1620, the web server 100 may publish the video in one or more online locations. The web server 100 may embed the video on the user's website and may publish the website together with the video. Additionally or alternatively, the web server 100 may publish the video on YOUTUBE and/or another video streaming service.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In some embodiments, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention has been described in terms of one or more preferred embodiments, and it should be appreciated that many equivalents, alternatives, variations, and modifications, aside from those expressly stated, are possible and within the scope of the invention.

We claim:

1. A method, comprising:
identifying, by a server computer electronically connected to a communication network, a plurality of potential content comprising one or both of public content and original content, wherein the original content is content created by or for a user, regarding a topic of the user's choosing, that is unique to the user's web presence when the user first publishes the original content on a first online platform and the public content is content generated by a third party, not specific for the user, which is found on a second online platform and is initially published on the second online platform by a party other than the user;

posting, by the server computer, one or more of the plurality of potential content to a third online platform of the user, wherein the first online platform, the second online platform and the third online platform comprise a website or a social network;

wherein identifying the original content comprises automatically commissioning the generation of the original content;

monitoring, by the server computer, interaction of the user's audience with the posted potential content on the third online platform; and updating, by the server computer, a ratio of original content to public content posted on the third online platform based on the monitored interaction, the ratio being used to identify a potential content in the plurality of potential content to post to the third online platform.

2. The method of claim 1, further comprising:
displaying, by the server computer, the potential content to the user; and
receiving a selection by the user of the potential content, wherein the potential content that is posted to the third online platform is the potential content selected by the user.

3. The method of claim 1, further comprising:
determining, by the server computer, a strategic time for posting content to the third online platform, the strategic time depending on the user's industry;
receiving from the user an identification of "smart post" potential content; and
posting the "smart post" potential content to the third online platform at the strategic time.

* * * * *